US012662431B2

(12) United States Patent
Dalhat

(10) Patent No.: US 12,662,431 B2
(45) Date of Patent: *Jun. 23, 2026

(54) METHOD FOR FORMING POLYMER MODIFIED ASPHALT

(71) Applicant: Imam Abdulrahman Bin Faisal University, Dammam (SA)

(72) Inventor: Muhammad Abubakar Dalhat, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 53 days.

This patent is subject to a terminal disclaimer.

(21) Appl. No.: 18/907,244

(22) Filed: Oct. 4, 2024

(65) Prior Publication Data

US 2026/0098156 A1     Apr. 9, 2026

Related U.S. Application Data

(63) Continuation of application No. 17/398,522, filed on Aug. 10, 2021, now Pat. No. 12,151,983.

(51) Int. Cl.
C08L 95/00          (2006.01)
C04B 24/26          (2006.01)
(Continued)

(52) U.S. Cl.
CPC ........ C04B 41/458 (2013.01); C04B 24/2688 (2013.01); C04B 26/26 (2013.01);
(Continued)

(58) Field of Classification Search
CPC ... C04B 41/458; C04B 24/2688; C04B 26/26; C04B 41/009; C04B 41/4861; C04B 41/63; C04B 2111/27
See application file for complete search history.

(56) References Cited

U.S. PATENT DOCUMENTS

| | | | | |
|---|---|---|---|---|
| 12,151,983 | B2* | 11/2024 | Dalhat | ................ C04B 41/4861 |
| 2005/0101702 | A1* | 5/2005 | Stuart, Jr. | ............... C08L 95/00 |
| | | | | 524/59 |

FOREIGN PATENT DOCUMENTS

| | | |
|---|---|---|
| CN | 103806077 A | 5/2014 |
| CN | 106189290 A | 12/2016 |

(Continued)

OTHER PUBLICATIONS

Franco ("Fabrication of a superhydrophobic polypropylene membrane by deposition of a porous crystalline polypropylene coating", Franco et al, Journal of Membrane Science 318 (2008) 107-113) (Year: 2008).*

(Continued)

*Primary Examiner* — Michael G Miller
(74) *Attorney, Agent, or Firm* — Oblon, McClelland, Maier & Neustadt, L.L.P.

(57)          ABSTRACT

A superhydrophobic asphalt and a method of its preparation. The superhydrophobic asphalt contains an asphalt layer containing a polymer modified asphalt, preferably a radial SBS modified asphalt, and a polypropylene layer. The polypropylene layer comprises granules of polypropylene thermally fused to the asphalt layer. The superhydrophobic asphalt has a water contact angle of 145 to 170°, above the classification threshold for superhydrophobicity. The method of preparing the superhydrophobic asphalt involves distributing polypropylene granules over the surface of a polymer modified asphalt and curing below the melting temperature of the polypropylene. The asphalt may find use in waterproofing applications such as roofing.

9 Claims, 13 Drawing Sheets

(51) Int. Cl.

| | | |
|---|---|---|
| *C04B 26/26* | (2006.01) | |
| *C04B 41/00* | (2006.01) | |
| *C04B 41/45* | (2006.01) | |
| *C04B 41/48* | (2006.01) | |
| *C04B 41/63* | (2006.01) | |
| *C09D 7/40* | (2018.01) | |
| *C09D 123/12* | (2006.01) | |
| *C04B 111/27* | (2006.01) | |

(52) U.S. Cl.
CPC ........ *C04B 41/009* (2013.01); *C04B 41/4861* (2013.01); *C04B 41/63* (2013.01); *C08L 95/00* (2013.01); *C09D 7/69* (2018.01); *C09D 123/12* (2013.01); *C04B 2111/27* (2013.01)

(56) References Cited

FOREIGN PATENT DOCUMENTS

| | | |
|---|---|---|
| CN | 107083191 A | 8/2017 |
| CN | 109957374 A | 7/2019 |
| CN | 110041826 A | 7/2019 |
| CN | 110318259 A | 10/2019 |
| CN | 111534228 A | 8/2020 |
| KR | 10-2008963 B1 | 8/2019 |

OTHER PUBLICATIONS

Dalhat ("Utilization of micronized recycled polyethylene waste to improve the hydrophobicity of asphalt surfaces", Dalhat et al, Construction and Building Materials 240 (2020) 117966, 13 pages, available online Jan. 5, 2020) (Year: 2020).*

Feng Li, et al., "Low-temperature organic phase change material microcapsules for asphalt pavement: preparation, characterisation and application", Journal of Microencapsulation, vol. 35, Nos. 7-8, 2018, pp. 635-642.

K H Ibrahim Al Helo, et al., "Evaluation of moisture-induced damage of stone matrix asphalt mixture with polymer modified binder", IOP Conference Series: Materials Science and Engineering, vol. 737, 2020, pp. 1-12.

Mahdi Zakerzadeh, et al., "Examining the effect of different super hydrophobic nanomaterials on asphalt pavements", Construction and Building Materials, vol. 180, Aug. 20, 2018, pp. 285-290 (Abstract only).

Haiyan Ji, et al., "Fabrication of a Stable Superhydrophobic Polypropylene Surface by Utilizing Acetone as a Non-Solvent", Journal of Dispersion Science and Technology, vol. 34, Issue 1, 2013, pp. 134-139 (Abstract only).

Michele Porto, et al., "Bitumen and Bitumen Modification: A Review on Latest Advances", Applied Sciences, vol. 9, No. 742, 2019, pp. 1-35.

Franco et al ("Fabrication of a superhydrophobic polypropylene membrane by deposition of a porous crystalline polypropyelene coating", Franco et al, Journal of Membrane Science 318 (2008) 107-113). (Year: 2008).

* cited by examiner

FIG. 4.
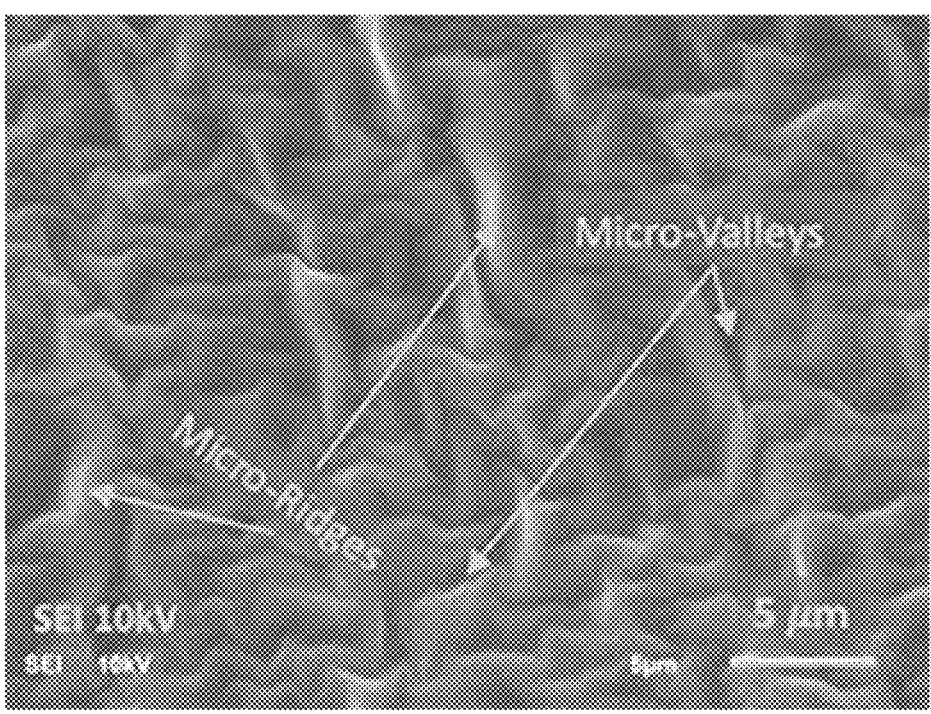
FIG. 5A.                                    FIG. 5B.
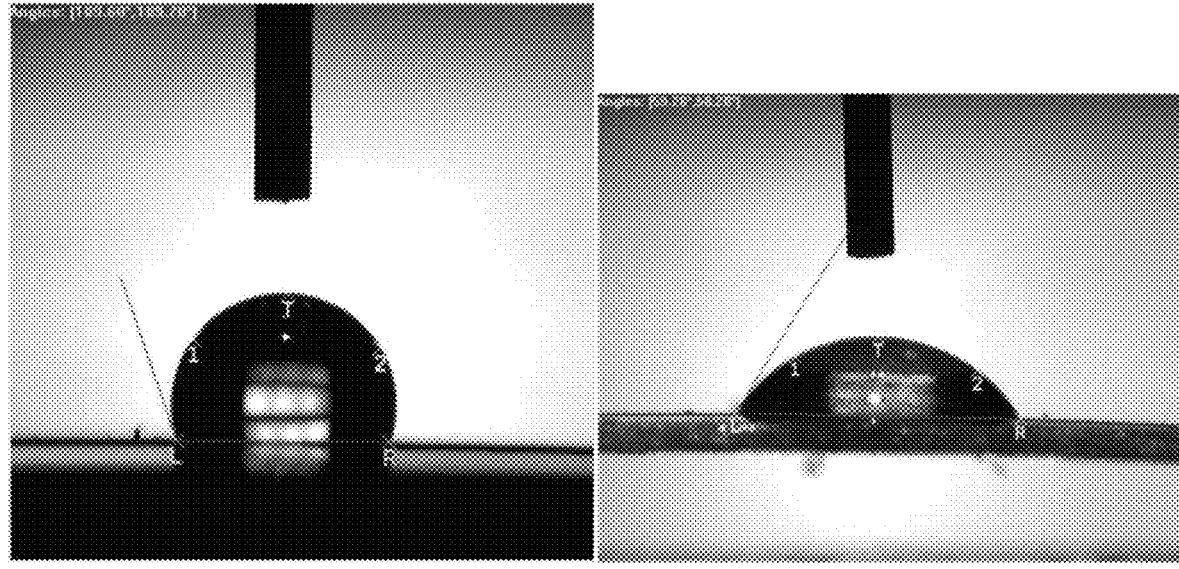

METHOD FOR FORMING POLYMER MODIFIED ASPHALT

CROSS-REFERENCE TO RELATED APPLICATIONS

The present application is a Continuation of U.S. application Ser. No. 17/398,522, now allowed, having a filing date of Aug. 10, 2021.

STATEMENT OF PRIOR DISCLOSURE BY THE INVENTORS

Aspects of this technology are described in the article "Water resistance and characteristics of asphalt surfaces treated with micronized-recycled-polypropylene waste: Super-hydrophobicity" published in Construction and Building Materials, 2021, Vol. 285, Page 122870, available on Mar. 11, 2021, which is incorporated herein by reference in its entirety.

BACKGROUND OF THE INVENTION

Field of the Invention

The present disclosure relates to a method of preparing a superhydrophic asphalt, a superhydrophic asphalt surface, and a superhydrophobic asphalt produced by the method.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Asphalt binder is one of the oldest known civil engineering materials employed for roofing, damp proofing, and waterproofing applications. This is mainly because asphalt binder is water-resistant, a property that makes it suitable for such applications. However, studies have shown that conventional and modified asphalt binders are only hydrophobic, not superhydrophobic (SH) [M. A. Dalhat, and A. Y. Adesina, Constr. Build. Mater. 240 (2020), incorporated by reference herein in its entirety]. Hydrophobic surfaces are characterized by Water Contact Angle (WCA) value that is greater than 90° and less than 145°, while Superhydrophobic surfaces exhibit WCA greater than 145° [K. Y. Law, J. Phys. Chem. Lett. 5 (4) (2014) 686-688]. Superhydrophobic surfaces possess exceptional water resistance properties, such that they are non-wetting due to their high WCA [J. Jeevahan, et. al., J. Coatings Technol. Res. 15 (2) (2018) 231-250]. Superhydrophobic surfaces hold several advantages over hydrophobic surfaces for engineering applications such as anti-icing, dust/mud self-cleaning, and corrosion resistance [X. Yan, et. al., in: 2012 Int. Conf. High Volt. Eng. Appl., 2012, pp. 282-285; C. Peng, et. al., Constr. Build. Mater. 264 (2020) 120702; C. Yu, et. al., Chem. Eng. Res. Des. 155 (2020) 48-65; M. Cui, et. al., Surf. Coatings Technol. 347 (2018) 38-45]. Snow build-up on roof tops is still an issue that results in accidents during manual cleaning [P. O. Bylund, et. al., Int. J. Inj. Contr. Saf. Promot. 23 (1) (2016) 105-109]. Snow build-up can lead to roof collapse due to overload and high energy requirements for indoor heating [A. C. Altunişik, et. al., Eng. Fail. Anal. 72 (2017)

67-78; O. Michael and W. Jennifer, Snow-Related Roof Collapse during the Winter of 2010-2011: implications for Building Codes, 2014; and M. Zhao, et. al., Build. Environ. 87 (2015) 82-91]. Accumulation of dust on asphalt roofs leads to soiling which in turn leads to fungal growth and degradation in high rainfall areas [P. Berdahl, et. al., Constr. Build. Mater. 22 (4) (2008) 423-433]. All of these aforementioned problems can be minimized or eliminated if roof surfaces can be made superhydrophobic.

Recycling is still considered among the key strategies of managing the plastic waste crisis of this era [R. C. Thompson, et. al., Philos. Trans. R. Soc. B Biol. Sci. 364 (1526) (2009) 2153-2166]. Studies have shown that unless a high plastic waste recycling rate and similar stringent waste management targets are achieved, the current environmental issues associated with plastic waste will worsen past the middle of the 21th century [L. Lebreton and A. Andrady, Palgrave Commun. 5 (2019) 6]. One facet of improving plastic recycling is to identify and create more products and uses for recycled plastic materials. The use of recycled polypropylene for preparing superhydrophobic materials may provide an important environmental benefit.

A wide variety of different asphalt formulations and asphalt additives have been investigated to determine and improve hydrophobicity. Study of the moisture susceptibility of asphalt mixtures reveals that the WCA of 60-70 penetration grade binder and its modified version containing wax and nano-materials lies in the range of 102°-105° [M. Arabani, et. al., J. Mater. Civ. Eng. 24 (7) (2012) 889-897]. In a study of asphalt binder surface free energy, a WCA of 60-100 penetration grade asphalt binders from six different sources was evaluated [A. Bahramian, Evaluating surface energy components of asphalt binders using Wilhelmy plate and sessile drop techniques, Royal Institute of Technology (KTH) (2012)]. The estimated WCA of the various asphalt binders revealed values that ranged between 100° and 104°. Similar research on the water resistance of 10 different asphalt binders also showed that five of the 70 #asphalt binders have WCA of 95°±7°, while styrene-butadienestyrene (SBS) modified asphalt binders and those with performance grade (PG) 76 showed WCA of 99°±5° [F. Zhang, et. al., Constr. Build. Mater. 176 (2018) 422-431]. The effect of c-(methacryloyloxy)-propyl-trimethoxy-silane coupling agent on the wettability of asphalt binder was also assessed [X. Liang, et. al., Appl. Mech. Mater. 105-107 (2012) 1773-1778]. Modification of the asphalt binder with up to 1% of the coupling agent raises its WCA from 97° to 102°. In another study of moisture susceptibility of modified asphalt binder using surface free energy, WCA of different binders obtained by modifying a PG 64-22 asphalt with nano-clay, devulcanized rubber, fly-ash, and SBS polymer was evaluated [J. Hu, et. al., Constr. Build. Mater. 256 (2020) 119429]. Maximum average WCAs of 89.8°, 88.6°, 90.6°, & 100.0° were recorded for 4% SBS, 2% nanoclay, 2% fly-ash, and 3.5% devulcanized-rubber modified asphalt binders respectively. However, in another study, a PG 64-16 asphalt binder upgraded to PG 70 and PG 76 using 1% and 4% SBS modification showed higher WCA of 106.3° and 109.9° respectively [M. A. Dalhat, and A. Y. Adesina, J. Mater. Civ. Eng. 31 (2019) 4019229, incorporated by reference herein in its entirety]. Modifying the asphalt binder with up to 20% polyurethane was not found to improve the WCA of the control asphalt binder before (100.85°) and after (106.32°) aging by any significant amount [C. Peng, et. al., Constr. Build. Mater. 247 (2020) 118547]. An earlier study showed that although modifying the asphalt binder with ground tire rubber (GTR) increases the asphalt cohesive energy, mixing the asphalt with 20% of GTR causes a decline in WCA of the binder from 98° to 83°, thereby leading to higher water-wetting-susceptibility of the asphalt [Z. Hossain, et. al., Constr. Build. Mater. 95 (2015) 45-53]. Based on existing literature, regular asphalt binders and those modified using conventional asphalt modification showed WCAs below 110°. These WCA values are significantly less than the minimum WCA limit of 145° for superhydrophobic surfaces. These previous research findings call for a different and or alternative approach towards improvement of asphalt binder WCA and moisture resistance.

Until recently, superhydrophobic properties were only reported on materials other than asphalt binder. Superhydrophobic polymethylmethacrylate (PMMA) surface was previously achieved by 12 h hard pressing, 30 min washing, 1 h baking at 50° C., and finally coating the PMMA surface with polydimethylsiloxane (PDMS) [Yung-Tsan Lin and Jung-Hua Chou, J. Mater. Sci. 50 (20) (2015) 6624-6630]. PMMA surfaces with 152.6°±1° WCA measurements were reported. Other studies reported achieving superhydrophobic properties using chemical functionalization. An example is silica-based suspension spray which was activated by perfluoro-decyl-tri-ethoxy-silane to form superhydrophobic surface [Q. Shang, et. al., J. Coat. Technol. Res. 11 (4) (2014) 509-515]. A recent study explored the potential of using 8 hydrophobic chemical treatments to reduce ice adhesion on asphalt concrete [M. Zakerzadeh, et. al., Constr. Build. Mater. 180 (2018) 285-290]. Of the 8 chemicals studied, only one (2,2,3,3,4,4,5,5-octafluoropentyl methacrylate) resulted in asphalt concrete surface with WCA above superhydrophobic limit (156°), after 24 h of curing. The other treated asphalt concrete surfaces showed WCA in the range of 130.2°±7°. In a non-conventional asphalt modification, superhydrophobic asphalt surface was also derived by thermally fusing micronized waste tire rubber of variables sizes on to the asphalt surface [M. A. Dalhat, and A. Y. Adesina, J. Mater. Civ. Eng. 31 (2019) 4019229]. A WCA of up to 156.2° was observed for thermal curing duration of 25 min. Another similar study used thermal treatment and micronized recycled polyethylene to attain SH asphalt surface with WCA of up to 155.9° [M. A. Dalhat, and A. Y. Adesina, Constr. Build. Mater. 240 (2020)]. To date no superhydrophobic asphalts based on recycled polypropylene have been reported, specifically recycled polypropylene (RPP) waste.

In view of the foregoing, it is an objective of the present disclosure to provide a method of forming a superhydrophobic asphalt and superhydrophobic asphalt surface using polypropylene and a superhydrophobic asphalt comprising an asphalt layer and a polypropylene layer.

SUMMARY OF THE INVENTION

The present disclosure relates to a method of forming a superhydrophobic asphalt, the method comprising applying a layer of polypropylene granules to a surface of a polymer modified asphalt to form an uncured coated asphalt; and curing the uncured coated asphalt at 75 to 150° C. to form the superhydrophobic asphalt, wherein the superhydrophobic asphalt comprises a polypropylene layer disposed upon an asphalt layer; the superhydrophobic asphalt has a water contact angle of 145 to 170°; and the polypropylene granules are substantially free of fluoropolymers and have a maximum particle size of 250 μm.

In some embodiments, the polymer modified asphalt is an elastomer-type polymer modified asphalt.

In some embodiments, the elastomer-type polymer modified asphalt is styrene-butadiene styrene (SBS)-modified asphalt.

In some embodiments, the styrene-butadiene-styrene is a radial styrene-butadiene-styrene and is present in an amount of 0.5 to 10 wt % based on a total weight of the styrene-butadiene styrene (SBS)-modified asphalt.

In some embodiments, the method further comprises mixing a non-polymer-modified asphalt having a performance grade of 64-16 with 0.5 to 10 wt % of an elastomer type polymer at 150 to 200° C. to form the elastomer-type polymer modified asphalt.

In some embodiments, the polymer modified asphalt has a softening point of 80 to 95° C., a viscosity at 135° C. of 1575 to 1650 cP, a ductility at 25° C. of 11.5 to 17.5 cm, a flash point of 300 to 360° C., and a performance grade of 76-10.

In some embodiments, the polypropylene granules are present in the uncured coated asphalt in an amount of 185 to 275 g polypropylene granules per $m^2$ of surface of the asphalt.

In some embodiments, the polypropylene granules have a minimum particle size of 100 μm.

In some embodiments, the curing is performed for 15 to 90 minutes.

In some embodiments, the polypropylene layer is present in an amount of 50 to 125 g per $m^2$ of polymer modified asphalt layer.

In some embodiments, the superhydrophobic asphalt has a work of adhesion of 1 to mN/m.

In some embodiments, the polypropylene layer has a $R_a$ surface roughness of 10 to 50 μm.

The present disclosure also relates to a superhydrophobic asphalt, comprising an asphalt layer comprising a polymer modified asphalt; and a polypropylene layer comprising polypropylene granules thermally fused onto the asphalt layer, wherein the superhydrophobic asphalt has a water contact angle of 145 to 170° and a $R_a$ surface roughness of 10 to 50 μm; and the polymer granules are substantially free of fluoropolymers and have a maximum particle size of 177 μm.

In some embodiments, the polymer modified asphalt has a softening point of 80 to 95° C., a viscosity at 135° C. of 1575 to 1650 cP, a ductility at 25° C. of 11.5 to 17.5 cm, a flash point of 300 to 360° C., and a performance grade of 76-10.

In some embodiments, the polymer modified asphalt is an elastomer-type polymer modified asphalt.

In some embodiments, the elastomer-type modified asphalt is styrene-butadiene styrene (SBS)-modified asphalt.

In some embodiments, the styrene-butadiene-styrene is a radial styrene-butadiene-styrene and is present in an amount of 0.5 to 10 wt % based on a total weight of the styrene-butadiene styrene (SBS)-modified asphalt.

In some embodiments, the polypropylene layer is present in an amount of 50 to 125 g per $m^2$ of polymer modified asphalt layer.

In some embodiments, the superhydrophobic asphalt is substantially free of silanes and/or siloxanes.

In some embodiments, the superhydrophobic asphalt has a work of adhesion of 1 to mN/m.

BRIEF DESCRIPTION OF THE DRAWINGS

FIG. 3A is mesh #80 RPP and FIG. 3B is mesh #100 RPP;

FIG. 4 is an SEM image of the SBS-modified asphalt substrate;

FIGS. 5A-5B are images of the water contact angle measurements for materials used in the method of present invention, where FIG. 5A is the untreated modified asphalt substrate and FIG. 5B is a polypropylene sheet;

FIG. 13A is a low magnification image of a surface prepared with mesh #80 and a 55 minute curing time, FIG. 13B is a high magnification image of a surface prepared with mesh #80 and a 55 minute curing time, FIG. 13C is a low magnification image of a surface prepared with mesh #100 and a 55 minute curing time, FIG. 13D is a high magnification image of a surface prepared with mesh #100 and a 55 minute curing time.

DETAILED DESCRIPTION OF THE INVENTION

Figure 1:
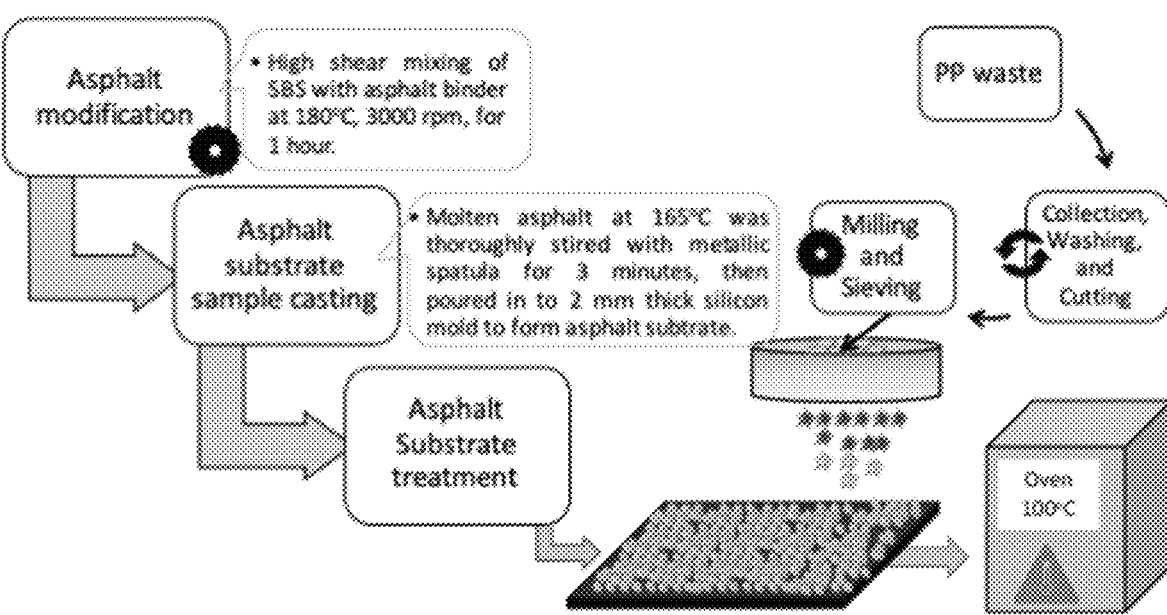
FIG. 1 shows a summary of an exemplary superhydrophobic asphalt preparation process according to an embodiment of the present invention.

In the following description, it is understood that other embodiments may be utilized and structural and operational changes may be made without departure from the scope of the present embodiments disclosed herein.

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

The phrase "substantially free", unless otherwise specified, describes a particular component being present in an amount of less than about 1 wt %, preferably less than about 0.5 wt %, more preferably less than about 0.1 wt %, even more preferably less than about 0.05 wt %, even more preferably less than about 0.01 wt %, even more preferably less than about 0.001 wt %, yet even more preferably 0 wt %, relative to a total weight of the composition being discussed.

Asphalt is a colloidal system similar to petroleum, but with lighter molecules removed. Asphalt can be fractionated into 4 major components: saturates, aromatics, resins and asphaltenes. The fractionated part of saturates and aromatics is considered as gas oil. Polarity of these four fractions can be arranged as:

saturates<aromatics<resin<asphaltenes.

Asphalt grading is given in accordance with accepted standards in the industry as discussed in the booklet SUPERPAVE Series No. 1 (SP-1), 1997 printing, published by the Asphalt Institute (Research Park Drive, P.O. Box 14052, Lexington, Ky. 40512-4052), as well as AASHTO Provisional Standard MP-1, each of which is incorporated herein by reference in its entirety. Asphalt compositions are frequently given performance grades, for example, PG 64-22. The first number, 64, represents the average 7-day maximum pavement design temperature in ° C. The second number, –22, represents the minimum pavement design temperature in ° C. Other requirements of each grade are as required by AASHTO Provisional Standard MP-1. For example, the maximum value for the PAV-DSR test (° C.) for PG 64-22 is 25° C.

According to a first aspect, the present disclosure relates to a method of forming a superhydrophobic asphalt, the method comprising applying a layer of polypropylene granules to a surface of a polymer modified asphalt to form an uncured coated asphalt, and curing the uncured coated asphalt at 75 to 150° C. to form the superhydrophobic asphalt.

Asphalts are commonly modified with non-bituminous additives. Such additives may serve to change the physical or chemical properties of the asphalt, such as the softening point, stiffness, viscosity, ductility, cracking resistance, embrittlement resistance, oxidation resistance, rate of volatiles loss, elastic recovery, water contact angle, work of adhesion, performance grade, and/or combination thereof. Examples of non-bituminous additives include, but are not limited to antioxidants, anti-stripping agents, stiffening agents, rejeuvenating agents, softening agents, and polymer additives.

Polymer additives typically refer to additives used for any suitable reason such as those outlined above which is polymeric in nature. Polymer additives used to make polymer modified asphalt are typically divided into two classes: plastomers and elastomers. Plastomers are polymers which display a combination of both plasticity and elasticity. In the context of asphalt additives, plastomers typically increase the stiffness and high temperature performance of asphalts, but may cause embrittlement, decreased low temperature performance, or loss of elastic recovery. Examples of plastomers include, but are not limited to polyethylene, polypropylene, ethylene-vinyl acetate (EVA), ethylene-butyl acetate (EBA), polyvinyl chloride (PVC), and polyethylene terephthalate (PET). Elastomers, in contract, are polymers which display elasticity. In the context of asphalt additives, elastomers typically increase the low temperature performance and elastic recovery of asphalts, but may be associated with decreased stiffness. Examples of elastomers include, but are not limited to styrene-butadiene rubber (SBR), styrene-butadiene-styrene (SBS), styrene-isoprene-styrene, and crumb rubber. Asphalts which contain polymer additives are typically referred to as polymer modified asphalts. In the context of the present disclosure, a polymer modified asphalt which contains a plastomer may be referred to as a "plastomer-type polymer modified asphalt", a polymer modified asphalt which contains an elastomer may be referred to as a "elastomer-type polymer modified asphalt", and a polymer modified asphalt which contains both a plastomer and an elastomer may be referred to as a "combination-type polymer modified asphalt".

Oxidation is a primary cause of long-term aging in asphalts and asphalt-containing materials. In this context, oxidation is the irreversible chemical reaction between oxygen molecules and the component species of bulk asphalt resulting in significant alterations to the desired physical and/or mechanical properties of asphalt. Oxidative aging of asphalt is believed to be caused by the generation of oxygen-containing polar chemical functionalities on asphalt molecules, which in turn can cause agglomeration among molecules due to increased intermolecular interactions such as hydrogen bonding, van der Waals force, and Coulomb force. Oxidation is typically associated with compositional changes in the asphalt that result in decreased aromatic fractions and increased asphaltenes fractions. As the asphalt oxidizes, it stiffens and can eventually crack. Antioxidants are commonly added to prevent, slow the rate of, reduce the amount of, or otherwise mitigate oxidation of asphalts. Examples of antioxidants used as additives for asphalt include, but are not limited to aldehydes such as furfural, formaldehyde, acetaldehyde, propionaldehyde, butyraldehyde, acrolein, cotonaldehye, tiglaldehyde, benzaldehyde, salicylaldehye, furfural alcohol, paraformaldehyde, cinnamaldehyde; thioesters such as dilauryl thiodipropionate (DLTDP), distearylthiodipropionate, and dimethyl 3,3'-thiodipropionate; lignin; vitamin E; Irganox® 1010 (available from BASF); and tetrakis(2,4-di-tert-butylphenyl) [1,1'-biphenyl]-4,4'-diylbis(phosphonite) (sold as Irgafos P-EPQ® by BASF).

A popular approach for mitigating the susceptibility of asphalt mixes to moisture damage (typically referred to as "stripping") is adding anti-stripping agents, particularly liquid anti-stripping agents (LAS), to asphalt. Anti-stripping agents are frequently surface active agents that can be added to asphalt, emulsion, and cutbacks. Generally, anti-stripping agents reduce the surface tension and increase the wettability of aggregates or surface layers, which produces better adhesion between the asphalt and the aggregate or surface layer. While the chemical composition of most commercially produced anti-stripping agents is proprietary, most anti-stripping agents contain amines. Examples of anti-stripping agents include amidoamines, imidazolines, polyamines, hydrated lime, amine-containing organometallics, and amino acids.

Stiffening agents are additives which increase the stiffness of an asphalt. Typically, stiffening agents are used in conjunction with other additives which may decrease the stiffness of the asphalt. In such situations, the stiffening agents are used to compensate for this decrease. Examples of stiffening agents include, but are not limited to polyphosphoric acid and gilsonite. Polyphosphoric acid in particular is commonly used in polymer modified asphalts, where it may serve to crosslink the polymer additive. Gilsonite (also known as asphaltite, uintahite, or asphaltum) is a naturally occurring soluble solid hydrocarbon mixture with a relatively high melting temperature. Gilsonite itself is rarely used as the major component in asphalts due to factors such as high melting temperature causing difficulty in mixing and application and poor low temperature performance, particularly embrittlement.

Rejuvenating agents and softening agents are additives typically used in recycled asphalts. Rejuvenating agents typically refer to additives which are intended to restore the rheological and chemical properties of an aged asphalt. Softening agents typically refers to additives which lower the viscosity of an aged asphalt. The aged asphalt may undergo processes such as volatiles loss or oxidation which change the chemical composition of the asphalt. A common strategy for mitigating such changes involves adding in components similar to the volatiles lost (softening agents) or components oxidized (rejuvenating agents). For this reason, rejuvenating agents and softening agents typically comprise oils comprising components such as saturated aliphatic hydrocarbons, monoaromatic hydrocarbons, diaromatic hydrocarbons, polyaromatic hydrocarbons, polar compounds and basic, pyridene-soluble compounds.

For additional information and examples of asphalt additives, see Porto, et. al. [Porto, M., et. al., Applied Sciences, 2019, 742, incorporated herein by reference in its entirety].

In the context of the present disclosure, the polymer modified asphalt may be any suitable polymer modified asphalt known to one of ordinary skill in the art. Such a polymer modified asphalt may comprise one or more other suitable additives such as those described above. The polymer modified asphalt may be a plastomer-type polymer modified asphalt, an elastomer-type polymer modified asphalt, or a combination-type polymer modified asphalt. In preferred embodiments, the polymer modified asphalt is an elastomer-type polymer modified asphalt. In some embodiments, the elastomer-type polymer modified asphalt comprises the elastomer styrene-butadiene-styrene (SBS). In preferred embodiments, the elastomer-type polymer modified asphalt is styrene-butadiene styrene (SBS)-modified asphalt. Such an asphalt is preferably devoid of plastomers and of non-SBS elastomers.

Styrene-butadiene-styrene (SBS) is a block copolymer of styrene and butadiene. SBS comprises at least one block of poly(butadiene) and at least two blocks of polystyrene. SBS is typically divided into two types based upon the arrangement of the poly(butadiene) block(s) and the polystyrene blocks. Linear SBS comprises a linear arrangement of alternating poly(butadiene) and polystyrene blocks, with each poly(butadiene) block having a polystyrene block attached to both ends. In this way, a single poly(butadiene) block is flanked by polystyrene blocks, with a polystyrene block forming each terminus of the linear arrangement. A common arrangement of linear SBS is a single polystyrene block, a single poly(butadiene) block, and a single polystyrene block. Examples of linear SBS elastomers, particularly those useful as asphalt additives include, but are not limited to Pavprene® 501, Pavprene® 501P, Kraton® D1192, Kraton® D1101, and LG™ SBS LG-501. Radial SBS, in contrast, comprises a branched poly(butadiene) block which has more than two polymer chain ends, each of which is connected to a polystyrene block. This give the radial SBS a star-shaped profile in which a central poly(butadiene) block is connected to multiple projecting polystyrene blocks. Examples of radial SBS elastomers, particularly those useful as asphalt additives include, but are not limited to Pavprene® 511K, Pavprene® 511P, Pavprene® 511C, Kraton® D1184, Kraton® D1191, and LG™ SBS LG-411. In some embodiments, the SBS-modified asphalt comprises radial SBS. In some embodiments, the SBS-modified asphalt is substantially free of linear SBS.

In some embodiments, the radial SBS is present in an amount of 0.5 to 10 wt %, preferably 0.75 to 9.5 wt %, preferably 1 to 9.0 wt %, preferably 1.25 to 8.5 wt %, preferably 1.5 to 8.0 wt %, preferably 1.75 to 7.5 wt %, preferably 2.0 to 7.0 wt %, preferably 2.25 to 6.5 wt %, preferably 2.5 to 6.0 wt %, preferably 2.75 to 5.5 wt %, preferably 3.0 to 5.0 wt %, preferably 3.25 to 4.75 wt %, preferably 3.5 to 4.5 wt %, preferably 3.75 to 4.25 wt %, preferably 3.9 to 4.1 wt %, preferably 4 wt % based on a total weight of the styrene-butadiene styrene (SBS)-modified asphalt.

An asphalt may be characterized by a quantity of asphaltenes, saturates, aromatics, and resins which may be fractionated. This composition is typically referred to as the SARA composition. Oils from different regions have different compositions based on saturates, aromatics, resins, and asphaltenes, thus the asphalts extracted from these sources also typically have a different composition. For example, from western Canadian oils saturates may be from 8 to 17 wt % relative to the total oil, aromatics may be from 36 to 44 wt % relative to the total oil, resins may be from 18 to 27 wt % relative to the total oil, asphaltenes may be from 15 to 20 wt % relative to the total oil; from Arabian oils saturates may be from 22 to 25 wt % relative to the total oil, aromatics may be from 26 to 50 wt % relative to the total oil, resin may be 10 to 18 wt % relative to the total oil, and asphaltenes may be 30 to 36 wt % relative to the total oil; and from Sumatran oils, saturates from 44 to 46 wt % relative to the total oil, aromatics may be from 30 to 33 wt % relative to the total oil, resins may be from 15 to 17 wt % relative to the total oil, asphaltenes may be from 7 to 10 wt % relative to the total oil. These quantities of asphaltenes, saturates, aromatics, and resins typically change from crude oil to asphalt as a result of the refining process. Further, these quantities may be changed by the addition of asphalt additives described above. In some embodiments, the polymer modified asphalt has a SARA composition comprising 25.0 to 30.0 wt %, preferably 25.5 to 29.5 wt %, preferably 26.0 to 29.0 preferably 26.25 to 28.50 preferably 26.5 to 28.25 wt %, preferably 26.75 to 28.0 wt %, preferably 27.0 to 27.75 wt %, preferably 27.25 to 27.5 wt %, preferably 27.3 wt % saturate. In some embodiments, the polymer modified asphalt has a SARA composition comprising 22.0 to 27.5 wt %, preferably 22.5 to 27.0 wt % preferably 23.0 to 26.5 wt %, preferably 23.5 to 26 wt %, preferably 23.75 to 25.75 wt %, preferably 24.0 to 25.5 wt %, preferably 24.25 to 25.25 wt %, preferably 24.5 to 25 wt %, preferably 24.6 to 24.85 wt %, preferably 24.7 to 24.8 wt % aromatics. In some embodiments, the polymer modified asphalt has a SARA composition comprising 17.0 to 21.5 wt %, preferably 18.5 to 21.25 wt %, preferably 18.0 to 21.0 wt %, preferably 18.25 to 20.75 wt %, preferably 18.5 to 20.5 wt % preferably 18.75 to 20.25 wt %, preferably 19.0 to 20.0 wt %, preferably 19.1 to 19.4 wt %, preferably 19.2 to 19.3 wt % resins. In some embodiments, the polymer modified asphalt has a SARA composition comprising 21 to 36 wt %, preferably 22.0 to 35.0 wt %, preferably 23.0 to 34.5 wt %, preferably 23.5 to 34.0 wt %, preferably 24 to 33.5 wt %, preferably 24.5 to 33.0 wt %, preferably 25 to 32.5 wt %, preferably 25.5 to 32.0 wt % preferably 26.0 to 31.5 wt %, preferably 26.5 to 31 wt %, preferably 26.75 to 30.75 wt %, preferably 27.0 to 30.5 wt %, preferably 27.25 to 30.25 wt %, preferably 27.5 to 30 wt %, preferably 27.75 to 29.75 wt %, preferably 28.0 to 29.5 wt % preferably 28.25 to 29.25 wt %, preferably 28.5 to 29.0 wt %, preferably 28.6 to 28.9 wt %, preferably 28.7 to 28.8 wt % asphaltene. Typically, the SARA composition of an asphalt is determined according to ASTM:D4124 [ASTM:D4124-09, Standard Test Method for Separation of Asphalt into Four Fractions, ASTM Int. West Conshohocken, PA. (2018). 10.1520/D4124-09R18].

In some embodiments, the elastomer-type polymer modified asphalt is prepared by mixing a non-polymer-modified asphalt having a performance grade of 64-16 with 0.5 to 10 wt %, preferably 0.75 to 9.5 wt %, preferably 1 to 9.0 wt %, preferably 1.25 to 8.5 wt %, preferably 1.5 to 8.0 wt %, preferably 1.75 to 7.5 wt %, preferably 2.0 to 7.0 wt %, preferably 2.25 to 6.5 wt %, preferably 2.5 to 6.0 wt %, preferably 2.75 to 5.5 wt %, preferably 3.0 to 5.0 wt %, preferably 3.25 to 4.75 wt %, preferably 3.5 to 4.5 wt %, preferably 3.75 to 4.25 wt %, preferably 3.9 to 4.1 wt %, preferably 4 wt % of an elastomer type polymer at 150 to 200° C., preferably 160 to 195° C., preferably 170 to 190° C., preferably 175 to 185° C., preferably 180° C. Preferably, the elastomer type polymer is SBS as described above. In preferred embodiments, the elastomer type polymer is a radial SBS as described above. The mixing may be performed using any suitable material or method known to one of ordinary skill in the art. In some embodiments, the mixing is performed at 1000 to 5000 rpm, preferably 1500 to 4500 rpm, preferably 2000 to 4000 rpm, preferably 2500 to 3500 rpm, preferably 3000 rpm. In some embodiments, the mixing is performed for 15 to 120 minutes, preferably 30 to 90 minutes, preferably 45 to 75 minutes, preferably 60 minutes.

In some embodiments, the polymer modified asphalt has a softening point of 80 to 95° C., preferably 81 to 92° C., preferably 82 to 90 C, preferably 83 to 89° C., preferably 84 to 88° C., preferably 85 to 87° C., preferably 86° C. The softening point may be measured by any suitable technique known to one of ordinary skill in the art. One standard method used is the ring and ball method for softening point test [ASTM:D36, Standard Test Method for Softening Point of Bitumen (Ring-and-Ball Apparatus), ASTM Int. West Conshohocken, PA. (2014)]. In some embodiments, polymer modified asphalt has a viscosity at 135° C. of 1575 to 1650 cP, preferably 1580 to 1645 cP, preferably 1585 to 1640 cP, preferably 1590 to 1635 cP, preferably 1595 to 1630 cP, preferably 1600 to 1625 cP, preferably 1605 to 1620 cP, preferably 1610 to 1615 cP. The viscosity may be measured by any suitable technique known to one of ordinary skill in the art. One standard method uses the rotational viscometer and is outlined in ASTM:D4402 [ASTM:D4402, Standard Test Method for Viscosity Determination of Asphalt at Elevated Temperatures Using a Rotational Viscometer., ASTM Int. West Conshohocken, PA. (2015)]. In some embodiments, the polymer modified asphalt has a ductility at 25° C. of 11.5 to 17.5 cm, preferably 11.75 to 17.25 cm, preferably 12 to 17 cm, preferably 12.25 to 16.75 cm, preferably 12.5 to 16.5 cm, preferably 12.75 to 16.25 cm, preferably 13 to 16 cm, preferably 13.25 to 15.75 cm, preferably 13.5 to 15.5 cm, preferably 13.75 to 15.25 cm, preferably 14 to 15 cm, preferably 14.25 to 14.75 cm, preferably 14.5 cm. The ductility may be measured by any suitable technique known to one of ordinary skill in the art. One standard is outlined in ASTM D113 [ASTM:D113-17, Standard Test Method for Ductility of Asphalt Materials, ASTM Int. West Conshohocken, PA. (2017)]. In some embodiments, the polymer modified asphalt has a flash point of 300 to 360° C., preferably 305 to 355° C., preferably 310 to 350° C., preferably 315 to 345° C., preferably 320 to 340° C., preferably 325 to 335° C., preferably 330° C. The flash point may be measured by any suitable technique known to one of ordinary skill in the art. One standard method used is the Cleveland open-cup test [ASTM:D92-18, Standard Test Method for Flash and Fire Points by Cleveland Open Cup Tester., ASTM Int. West Conshohocken, PA. (2018)]. In some embodiments, the polymer modified asphalt has a performance grade of 76-10.

The polypropylene granules may be granules of any suitable polypropylene known to one of ordinary skill in the art. The polypropylene may be characterized by mechanical properties, thermal properties, chemical properties, or a combination of these. In some embodiments, the polypropylene has a bulk density of 0.850 to 0.950 g/cm$^3$, preferably 0.860 to 0.945 g/cm$^3$, preferably 0.875 to 0.940 g/cm$^3$, preferably 0.880 to 0.935 g/cm$^3$, preferably 0.885 to 0.930 g/cm$^3$, preferably 0.890 to 0.925 g/cm$^3$, preferably 0.895 to 0.920 g/cm$^3$. In some embodiments the polypropylene has a melting point of 130 to 171° C., preferably 140 to 168° C., preferably 150 to 166° C., preferably 160 to 165° C., preferably 161 to 163° C., preferably 162° C. The polypropylene may be totally crystalline, totally amorphous, be of intermediate crystallinity. The polypropylene may be atactic, syndiotactic, isotactic, or a combination thereof. While the polypropylene may contain appropriate additives known to one of ordinary skill in the art, such as dyes, plasticizers, crosslinkers, and the like, the polypropylene should be substantially free of fluoropolymers. Such fluoropolymers are sometimes integrated into the bulk of a polypropylene sample and/or disposed on a surface of a polypropylene sample. In some embodiments, the polypropylene is substantially free of polyethylene.

Preferably, the polypropylene is used in the form of granules. These granules may be formed by any suitable technique or combination of techniques known to one of ordinary skill in the art. For example, the polypropylene granules may be formed using a technique which involves the solidification of a liquid polypropylene such as extrusion, thermoforming, molding, blowing, and rotational forming. Alternatively, the polypropylene granules may be formed by reducing a larger polypropylene sample to smaller particles. Such a reduction to smaller particles may be performed by any suitable technique or with any suitable equipment known to one of ordinary skill in the art. Examples of such techniques include, but are not limited to, milling, grinding, ball milling, chopping, pulverizing, crushing, pounding, mincing, shredding, smashing, and fragmenting. In some embodiments, the milling may take place using a mill, ball mill, rod mill, autogenous mill, cutting mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles. Preferably, the polypropylene granules are separated by size following the reduction to smaller particles. Such separation by size may be performed using any suitable technique or with any suitable equipment known to one of ordinary skill in the art. In preferred embodiments, the granules are sieved. The granules which pass through a sieve may be defined by a maximum size capable of passing through the sieve, the maximum size defined by a sieve spacing. The granules which are retained by a sieve may be defined by a minimum size which is incapable of passing through the sieve, the minimum size defined by the sieve spacing.

The polypropylene granules used in the method should have a maximum particle size of 250 μm, preferably 245 μm, preferably 240 μm, preferably 235 μm, preferably 230 μm, preferably 225 μm, preferably 220 μm, preferably 215 μm, preferably 210 μm, preferably 205 μm, preferably 200 μm, preferably 195 μm, preferably 190 μm, preferably 185 μm, preferably 180 μm, preferably 177 μm. Preferably, this maximum size is determined by passing the granules through a sieve which is designed to retain particles having a size larger than the maximum size. Such retained particles are thus separated from the particles which pass through the sieve, said particles which pass through then being used as the granules. In some embodiments, the polypropylene granules have a minimum size of 100 μm, preferably 105 μm, preferably 110 μm, preferably 115 μm, preferably 120 μm, preferably 125 μm, preferably 130 μm, preferably 135 μm, preferably 140 μm, preferably 145 μm, preferably 149 μm. Preferably, this minimum size is determined by passing the granules through a sieve which is designed to retain particles having a size equal to or larger than the minimum size. These retained particles are then used as the granules.

In general, the polypropylene granules may be any suitable shape known to one of ordinary skill in the art. Examples of such suitable shapes include, but are not limited to spheres, cylinders, boxes, spikes, flakes, plates, ellipsoids, stars, ribbons, discs, rods, prisms, cones, platelets, and sheets.

The polypropylene granules may be applied to the polymer modified asphalt using any suitable technique known to one of ordinary skill in the art. Preferably, the polypropylene granules are applied in such a manner so as to uniformly cover an entirety of the surface of the polymer modified asphalt. In some embodiments, the polypropylene granules are present in the uncured coated asphalt in an amount of 185 to 275, preferably 190 to 270 g, preferably 195 to 265 g, preferably 200 to 260 g, preferably 205 to 255 g, preferably 210 to 250 g, preferably 215 to 245 g polypropylene granules per m$^2$ of surface of the polymer modified asphalt.

The curing is performed at 75 to 150° C., preferably 80 to 140° C., preferably 85 to 130° C., preferably 90 to 120° C., preferably 95 to 110° C., preferably 100° C. The curing is preferably performed below the melting temperature of the polypropylene granules. Such melting may be disadvantageous to achieving the desired superhydrophobic properties. In some embodiments, the curing is performed for 15 to 90 minutes, preferably 20 to 80 minutes, preferably 25 to 70 minutes, preferably 30 to 65 minutes, preferably 35 to 60 minutes, preferably 40 to 55 minutes.

The superhydrophobic asphalt produced comprises a polypropylene layer disposed upon an asphalt layer. The asphalt layer comprises the polymer modified asphalt as described above. The polypropylene layer comprises the polypropylene granules which are thermally fused to the asphalt layer. The thermal fusing may involve softening or partial melting of the polymer modified asphalt such that the polypropylene granules become partially or totally embedded in the asphalt layer. In some embodiments, the polypropylene layer is present in an amount of 50 to 125 g, preferably 55 to 115 g, preferably 60 to 110 g, preferably 65 to 105 g, preferably 70 to 100 g, preferably 75 to 95 g, preferably 80 to 90 g per m$^2$ of asphalt layer. Preferably, the polypropylene granules present in the polypropylene layer are substantially similar to the polypropylene granules which were applied to form the uncured coated asphalt. Such similarity may be in the particle size, particle shape, or both. Similarity in the particle size may be such that the size of the polypropylene granules present in the polypropylene layer (i.e. after curing) differs from the size of the polypropylene granules used to form the uncured coated asphalt by no more than 25%, preferably no more than 20%, preferably no more than 15%, preferably no more than 10%, preferably no more than 7.5%, preferably no more than 5%, preferably no more than 2.5%. Such a size may be a mean size, a median size, a maximum size, or a minimum size.

In some embodiments, the granules are embedded in the surface of the polymer modified asphalt such that the granule comprises a protrusion portion and an embedded portion. The protrusion portion extends above the surface of the polymer modified asphalt in the immediate area of the granule while the embedded portion is embedded within the polymer modified asphalt. The embedded portion may be surrounded by the polymer modified asphalt and extend below the surface of the polymer modified asphalt in the immediate area of the granule. In general, the protrusion portion may take on any suitable shape known to one of ordinary skill in the art, such as those shapes described above. In some embodiments, the protrusion portion may take on a shape which is defined by a contiguous part of the shapes described above. Such contiguous parts may include edges, vertices, and faces as appropriate. Examples of such shapes defined by a contiguous part of the shapes described above include, but are not limited to a hemisphere formed from a sphere, a dome-shape formed from a sphere or ellipsoid, a half disc from a disc, a rectangular prism from a cube or rectangular prism, a pyramid having a triangular base from a cube or rectangular prism, a pyramid having a square base from an octahedron, and an irregular shape formed from a different irregular shape. It should be noted that even in embodiments in which the granules have a single shape, the shape of the protrusion portions formed from that shape may be different. In some embodiments, the protrusion portion has a protrusion portion size which is 5 to 50%, preferably 6 to 45%, preferably 7 to 40%, preferably 8 to 37.5%, preferably 9 to 35%, preferably 10 to 32.5%, preferably 11 to 30%, preferably 12 to 27.5%, preferably 13 to 26%, preferably 13.5 to 25% of a total size of the granule. In such embodiments, the remainder of the total size of the granule may comprise the embedded portion.

In some embodiments, the superhydrophobic asphalt is substantially free of silanes and/or siloxanes. Such materials are commonly used to increase hydrophobicity of various materials, including asphalts. Such materials are frequently applied as surface treatments. The inclusion of such materials as a surface layer or surface coating on the superhydrophobic asphalt is not envisioned in any embodiment. In some embodiments, the superhydrophobic asphalt is substantially free of fluoropolymers. Fluoropolymers, particularly polytetrafluoroethylene (PTFE), are also commonly used to increase hydrophobicity of various materials, including asphalts. The inclusion of such fluoropolymers, either as a component which is mixed into the polypropylene layer or as a surface layer or surface coating on the superhydrophobic asphalt is not envisioned in any embodiment.

The superhydrophobic asphalt may be characterized by a standard measure of hydrophobicity known to one of ordinary skill in the art. Typically, hydrophobicity is measured by water contact angle. Standard procedure and specifications adopted for water contact angle measurements are provided in ASTM D7334 [ASTM:D7334-08, Standard Practice for Surface Wettability of Coating, Substrates and Pigments by Advancing Contact Angle Measurement, (2013), incorporated herein by reference in its entirety]. In some embodiments, the superhydrophobic asphalt has a water contact angle of 145 to 170°, preferably 147.5 to 167.5°, preferably 150 to 165°, preferably 152.5 to 162.5°, preferably 153 to 160°. In some embodiments, the water contact angle is measured on a freshly-prepared superhydrophobic asphalt. Exposure to outdoor conditions, such as sunlight, temperature fluctuations, precipitation, and seasonal variation in the aforementioned parameters may cause a degradation or other structural change of the superhydrophobic asphalt which may be associated with a lowering of the water contact angle. In some embodiments, the superhydrophobic asphalt has a post-exposure water contact angle which is at least 85%, preferably at least 87.5%, preferably at least 90%, preferably at least 92.5%, preferably at least 95%, preferably at least 97.5% of a pre-exposure water contact angle after exposure to outdoor conditions for at least 6 months, preferably at least 8 months, preferably at least 10 months, preferably at least 12 months, preferably at least 14 months, preferably at least 16 months, preferably at least 18 months, preferably at least 20 months, preferably at least 22 months, preferably at least 24 months. The superhydrophobic asphalt may be further characterized by the work of adhesion. The work of adhesion is a measure of the energy per unit area required to separate un-absorbed liquid from a solid surface. Typically, hydrophobic and superhydrophobic surfaces have lower values for the work of adhesion compared to hydrophilic surfaces. In some embodiments, the superhydrophobic asphalt has a work of adhesion of 1 to 15 mN/m, preferably 1.50 to 14 mN/m, preferably 2.00 to 13 mN/m, preferably 2.50 to 12.5 mN/m, preferably 3.00 to 12.0 mN/m, preferably 3.5 to 11.75 mN/m, preferably to 4.35 to 11.48 mN/m, preferably 6.50 to 9.60 mN/m.

The superhydrophobic asphalt may be characterized by a surface roughness parameter which may be directly related to the superhydrophobicity as measured by, for example, water contact angle or work of adhesion as described above. In some embodiments, the polypropylene layer has a $R_a$ surface roughness of 10 to 50 µm, preferably 12.5 to 47.5 µm, preferably 15 to 45 µm, preferably 17.5 to 42.5 µm, preferably 20 to 40 µm, preferably 21 to 39 µm, preferably 22 to 38 µm, preferably 23 to 37 µm, preferably 24 to 36 µm, preferably to 35 µm. In some embodiments, the polypropylene layer has a RMS surface roughness of to 65 µm, preferably 22.5 to 62.5 µm, preferably 25 to 60 µm, preferably 27.5 to 57.5 µm, preferably 30 to 55 µm, preferably 32.5 to 52.5 µm, preferably 35 to 50 µm, preferably 36 to 49 µm. Such values of surface roughness (either RMS or Ra) would permit the polypropylene layer to be described as "microtextured" as the surface comprises features smaller than or has a surface roughness less than 500 µm.

The superhydrophobic asphalt may find use as a waterproofing material itself or a component part of a waterproofing material. Such a waterproofing material may be used in roofing applications. Such a waterproofing material may be useful as a coating which is applied to a flat or curved surface. The superhydrophobic asphalt may also find use as paving material itself of a component part of a paving material. Such a paving material may be used to pave, for example, roads, airport runways, aprons, or ramps, walkways, stairs, or portions thereof. The waterproofing material and/or paving material may be useful for placing on surfaces symbols, writing, or other marks which are waterproof and/or superhydrophobic.

The examples below are intended to further illustrate protocols for preparing and characterizing the superhydrophobic asphalt of the present disclosure and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Preparation of Superhydrophobic Asphalt

An SBS modified asphalt substrate with performance grade of 76-10 was used herein. Asphalt-SBS modification was achieved by hot blending 4% of radial-type-SBS with performance grade 64-16 fresh asphalt binder at 180° C., for 1 h at 3000 rpm. The choice of SBS modified asphalt as substrate was due to its wide application in roofing and waterproofing industry [K. Oba, and M. Hugener, Mater. Struct. 28 (9) (1995) 534-544]. Basic properties of the SBS asphalt substrate are presented in Table 1. Flash point was obtained using Cleveland open-cup test [ASTM:D92-18, Standard Test Method for Flash and Fire Points by Cleveland Open Cup Tester., ASTM Int. West Conshohocken, PA. (2018)]. Viscosity was measured using rotational viscometer [ASTM:D4402, Standard Test Method for Viscosity Determination of Asphalt at Elevated Temperatures Using a Rotational Viscometer., ASTM Int. West Conshohocken, PA. (2015)]. Ring and ball method was used for softening point test [ASTM:D36, Standard Test Method for Softening Point of Bitumen (Ring-and-Ball Apparatus), ASTM Int. West Conshohocken, PA. (2014)]. Ductility test was according to ASTM D113 [ASTM:D113-17, Standard Test Method for Ductility of Asphalt Materials, ASTM Int. West Conshohocken, PA. (2017)]. The saturate, aromatics, resins and asphaltene (SARA) compositions of the fresh asphalt were estimated to be 27.33%, 24.72%, 19.22%, and 28.73% respectively [ASTM:D4124-09, Standard Test Method for Separation of Asphalt into Four Fractions, ASTM Int. West Conshohocken, PA. (2018)].

TABLE 1

| Physical properties of SBS-modified asphalt substrate. | | | |
|---|---|---|---|
| Softening Point | Viscosity at 135° C. | Ductility at 25° C. | Flash Point |
| 86° C. | 1612 cP | 14.5 cm | 330° C. |

Figure 2:
FIG. 2 is an image of milled RPP waste.
Figure 3A:
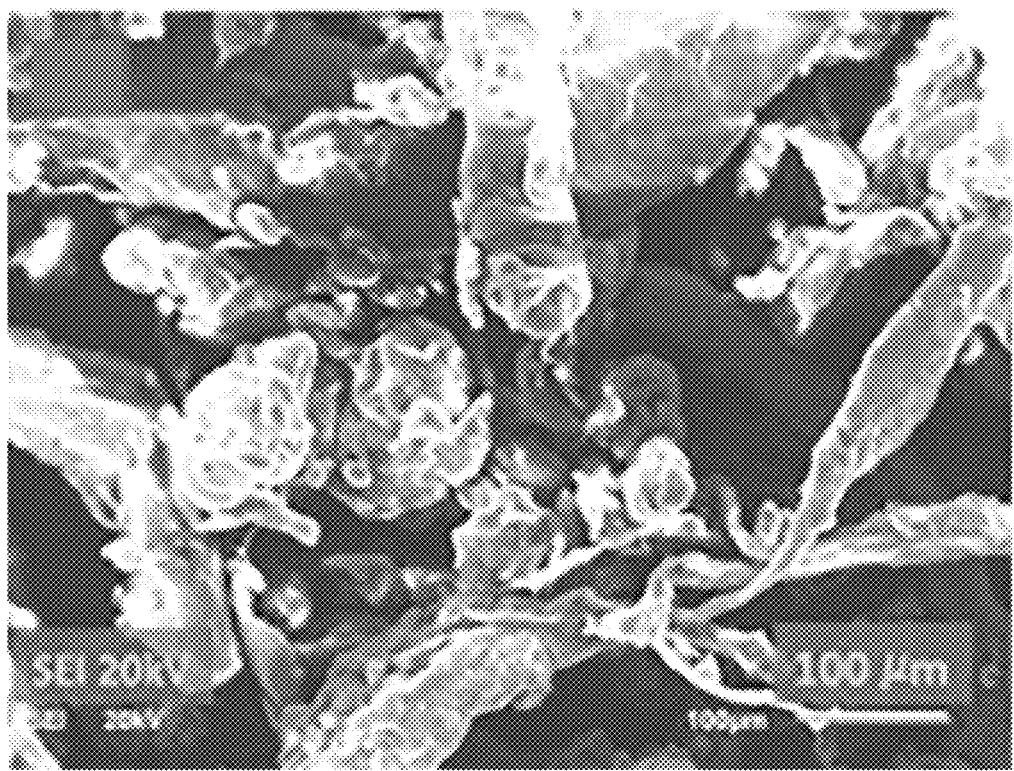
FIGS. 3A-3B are SEM images of RPP powders, where
Figure 3B:
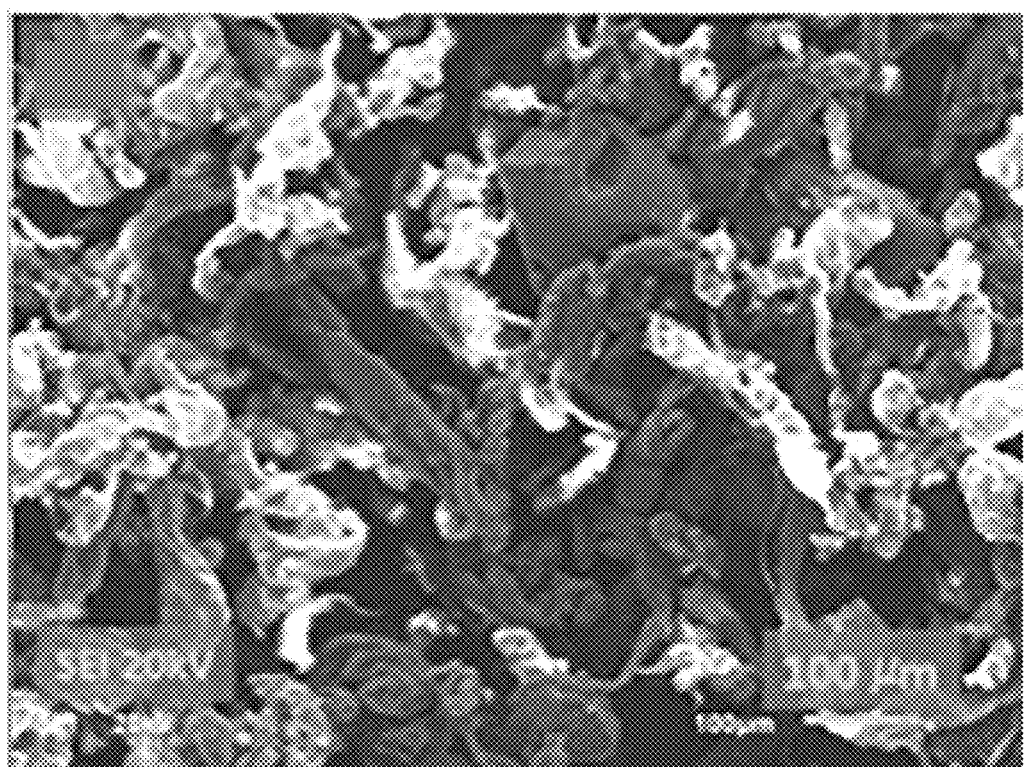

Polypropylene waste was identified and collected from municipal waste based on its recycled label #5. Disposable polypropylene plastic cups were targeted and isolated from the waste. The collected plastic waste was recycled by washing, drying, and cutting to produce recycled polypropylene (RPP). The RPP was further milled to finer material having size of <3 mm using a Universal Cutting Mill Pulverisette 19 (FRITSCH, Germany). An image of the processed and milled recycled polypropylene is shown in FIG. 2. The milled RPP material was sieved to obtain two different sizes using mesh #80 (177 mm) and #100 (149 mm). The first size passes sieve #80 and was retained on sieve #100, while the second size passes sieve #100. The first micronized RPP size was designated as #80 and the second as #100. Scanning Electron Microscopy (SEM) was employed to study the morphologies of the two micronized RPP materials (JSM-5800LV, JEOL, Japan), as provided in FIGS. 3A-3B. FIG. 3A shows the mesh #80 micronized RPP and FIG. 3B shows the mesh #100 micronized RPP. Differential scanning calorimetry (DSC) was also used to characterized the micronized RPP with DSC Q1000 V9.4, USA. DSC test was run in Nitrogen ($N_2$) environment, with 50 mL/min flowrate, using 3 heat/cool/heat cycles at 10° C. heating and cooling rate [ASTM:D3418, Standard Test Method for Transition Temperatures and Enthalpies of Fusion and Crystallization of Polymers by Differential Scanning calorimetry, ASTM Int. West Conshohocken, PA. (2015)].

FIG. 1 summarizes the preparation process of the micronized RPP-treated asphalt surfaces. A thin layer (2 mm) of molten SBS modified asphalt binder was first casted in a silicon mold. The asphalt was initially melted at 165° C. for a duration of approximately 40 min in an oven. Molten asphalt was stirred manually using metallic spatula for around 2 to 3 min before casting the thin substrate layer. The 2 mm thick asphalt substrate was then transferred from the silicon mold to a 2×3×0.5 cm aluminum base after cooling. The surface of the asphalt substrate was uniformly covered with a blanket of the micronized RPP ($230\pm15$ g/m$^2$) using a sieve. The set-up (asphalt-substrate on aluminum base covered with RPP) was put in an oven to cure at 100° C. The curing temperature was carefully selected to prevent excessive melting of the asphalt substrate. Samples were produced for three difference curing durations (25, 40, & 55 min) for each size of the micronized RPP. The initial 25 min curing time was found to be the minimal time needed for meaningful surface coverage to be achieved at the curing temperature. At the end of each curing duration, samples were brought out to be cooled for at least 10 min before blowing-off the surplus (un-attached) micronized RPP. All samples were characterized and tested within 24 h after preparation.

Surface profile of the RPP-treated asphalt surfaces was analyzed using 3D optical profilometer (Contour GT-K, Bruker, USA). Instruments and measurements for the surface profile were performed according to ISO 25178 standard specifications part 1 to part 600. Water contact angle (WCA) of the surfaces was estimated using sessile drop video contact angle measurement system (VCA Optima, AST Products, USA). Standard procedure and specifications adopted for WCA measurements are according to ASTM D7334 [ASTM:D7334-08, Standard Practice for Surface Wettability of Coating, Substrates and Pigments by Advancing Contact Angle Measurement, (2013)]. A de-ionized water droplet (3 mL) was used for WCA measurement at room temperature (23±1° C.). At least 3 replicate measurements were taken at random spots on each sample for the WCA and surface roughness parameter. SEM was used to study the morphology of the RPP-treated asphalt surface. This includes micronized-RPP asphalt bond-interface analysis. Short-term stability of the SHRPP-asphalt surfaces was assessed by re-evaluating the WCA of the substrates after 1-year exposure. Samples were exposed to environment with an annual average temperature of 24±7.0° C., relative humidity of 55±6.5%, and daily sunlight of 8±1 h respectively. Work of adhesion (WA) between the water droplets and RPP-treated asphalt surfaces was estimated using Young's equation given in Eq. (1) [M. Zakerzadeh, et. al., Constr. Build. Mater. 180 (2018) 285-290; and N. K. Adam, and H. K. Livingston, Nature 182 (1958) 128]. In Eq (1), cL represents the surface tension of the liquid phase, and θ the contact angle between the liquid and the solid phase. Surface tension of de-ionized water at room temperature was taken as 72.75 mNm$^{-1}$ [N. R. Pallas, and Y. Harrison, Colloids Surf. 43 (2) (1990) 169-194].

$$WA = \gamma_L (1 + \cos\theta) \qquad (1)$$

Characterization of Superhydrophobic Asphalt

FIG. 4 shows the surface microstructure of the untreated SBS-modified asphalt substrate. The SEM image of the surface revealed micro-ridge and valley texture having zig-zag-like orientation. Profile roughness measurements indicated that the asphalt substrate surface has Arithmetic Mean Deviation roughness (Ra) of 1.27±0.77 mm, and Root Mean Squared roughness (RMS) of 1.69±1.14 mm. This placed the asphalt surface at N7 roughness grade category based on International Organization for Standardization [ISO, Geometrical product specification (GPS)—Surface texture:

Areal—Part 70: Material measures, Int. Organ. Stand. ISO 25178 (2017)]. Because the average WCA of the asphalt surface was estimated to be around 109.9±0.9° (see sample result in FIG. 5A), the existing surface profile and chemistry of the asphalt substrate was only hydrophobic. This WCA value qualifies the asphalt substrate to be well within the hydrophobic class, and 35° away from being superhydrophobic. However, it has been established that a hydrophobic material with a WCA between 100°-120° could achieve superhydrophobicity with WCA of up to 170° if successfully microtextured [Aurélie Lafuma, David Quéré, Nat. Mater. 2 (7) (2003) 457-Recent previous studies have shown that this phenomena applies for asphalt binder if appropriately treated with the right material [M. A. Dalhat, and A. Y. Adesina, Constr. Build. Mater. 240 (2020); and M. A. Dalhat, and A. Y. Adesina, J. Mater. Civ. Eng. 31 (2019) 4019229]. These past studies utilized micronized tire rubber and recycled polyethylene waste, respectively, to achieve the superhydrophobic asphalt surface. Here, micronized RPP was used to successfully transform the hydrophobic asphalt surface to superhydrophobic. The WCA of thin sheet of the unprocessed RPP surface was also measured, as shown in FIG. 5B. The WCA (59.4±0.5°) of the unprocessed RPP sheet was observed to be within the hydrophilic range (<90° C.) [K. Y. Law, J. Phys. Chem. Lett. 5 (4) (2014) 686-688].

Figure 6:
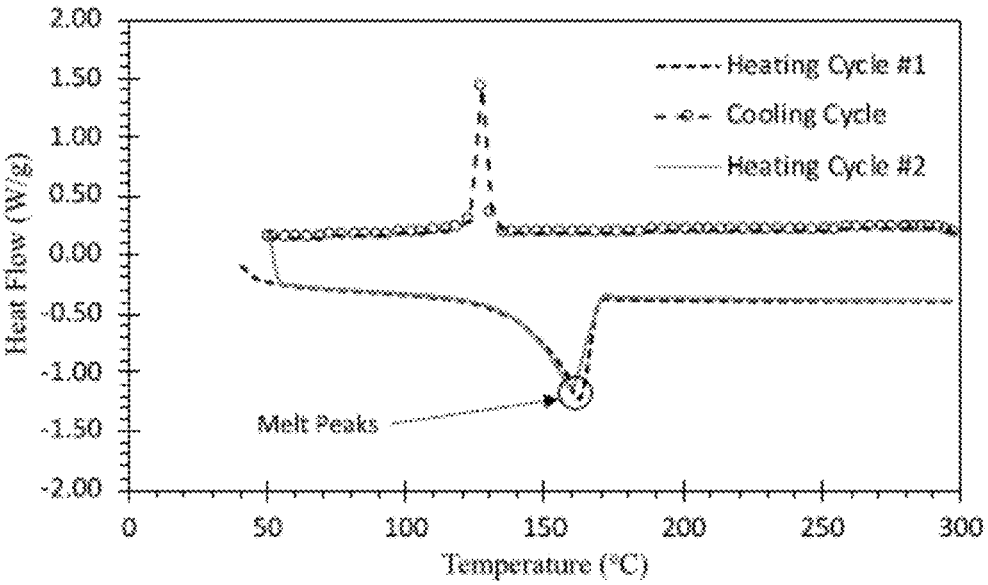
FIG. 6 is a plot of the Differential Scanning calorimetry (DSC) analysis of RPP.

The SEM images of the micronized RPP passing mesh #80 and #100 are shown in FIGS. 3A and 3B respectively. Both powders showed elongated and rugged morphology having teared edges resulting from the milling process. As expected, the RPP powder passing mesh #80 showed lager grain size than its counter-part (mesh #100). The sizes of the micronized RPP and their surface morphology are expected to influence the roughness and WCA of the asphalt substrate. Results of the thermal characterization of the RPP powder using differential scanning calorimetry are shown in FIG. 6. The two melting curves showed endothermic peaks just a little beyond 160° C., indicating that the average melting point of the RPP is approximately 162° C. This finding is in good agreement with previous studies on the melting characteristics of virgin polypropylene [T. McNally, et. al., Polymer (Guildf). 43 (13) (2002) 3785-3793]. The observed melting temperature of the RPP indicates that the micronized RPP should not be expected to undergo any significant change in shape and size during curing at 100° C. Physical attachment/bonding will be mainly due to asphalt softening and sinking of the RPP particles.

Figure 7:
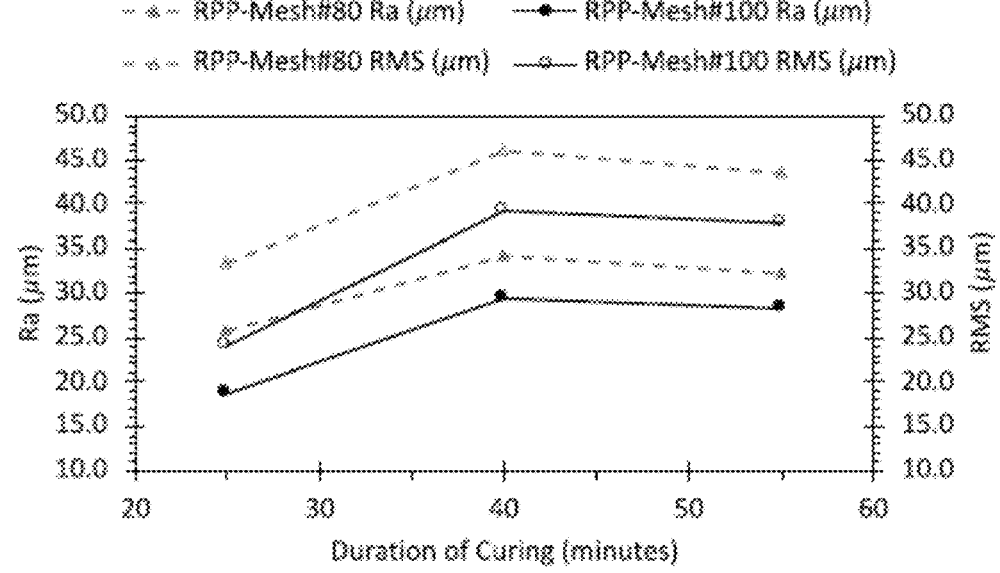
FIG. 7 is a plot of the surface roughness results of the RPP-treated asphalt surfaces.
Figure 8A:
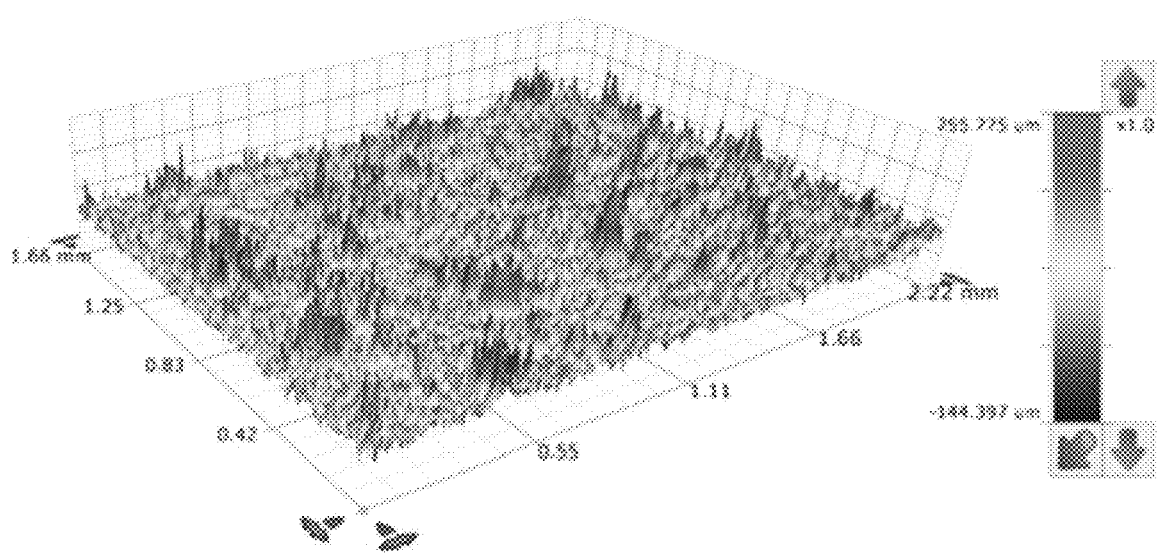
FIGS. 8A-8F are 3D plots of the surface profile of asphalt substrate treated with RPP-mesh #80 cured for 25 min (FIG. 8A), 40 min (FIG. 8B), 55 min (FIG. 8C), and RPP-mesh #100 cured for 25 min (FIG. 8D), 40 min (FIG. 8E), and 55 min (FIG. 8F)
Figure 8B:
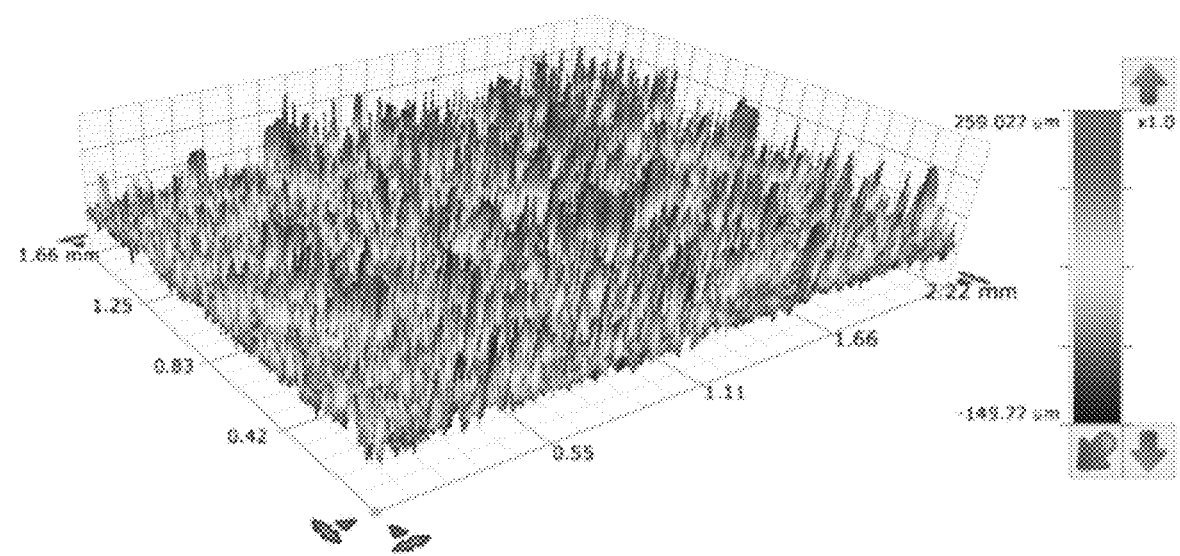
Figure 8C:
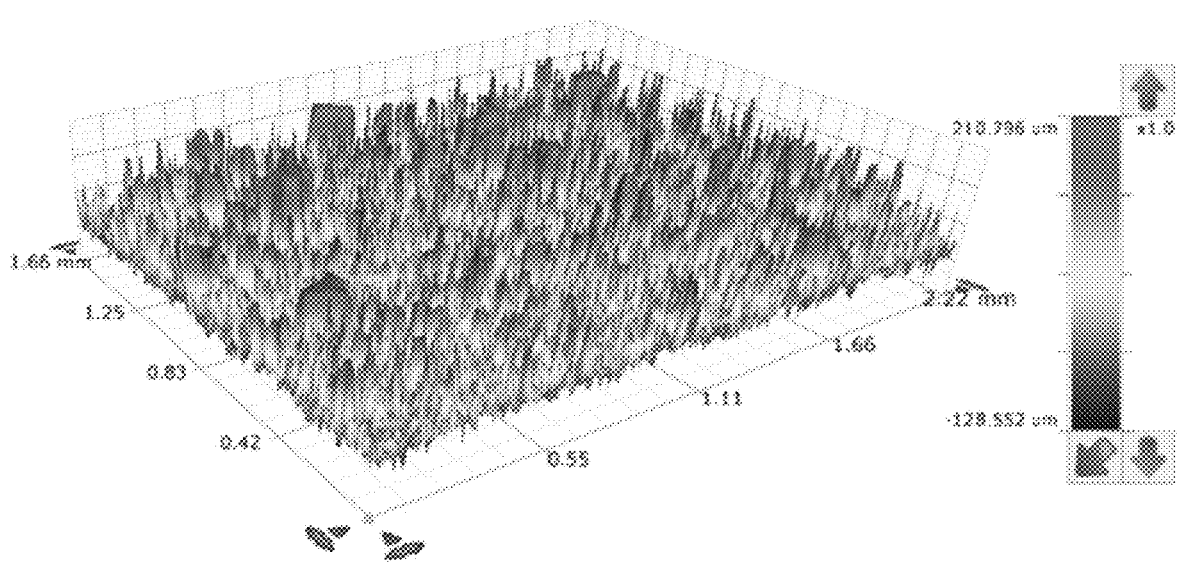
Figure 8D:
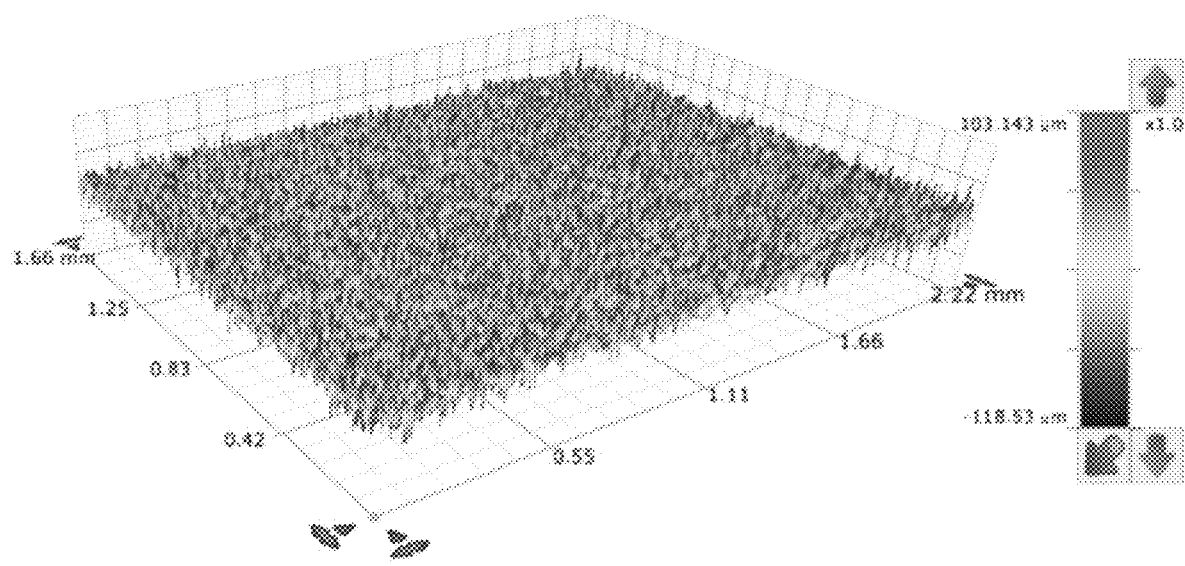
Figure 8E:
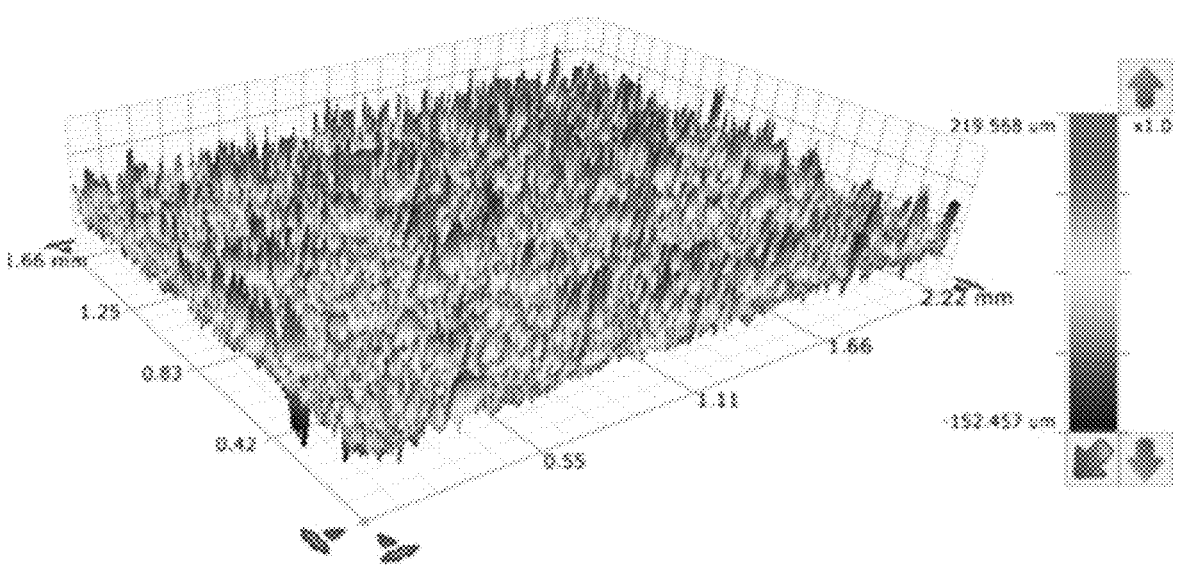
Figure 8F:
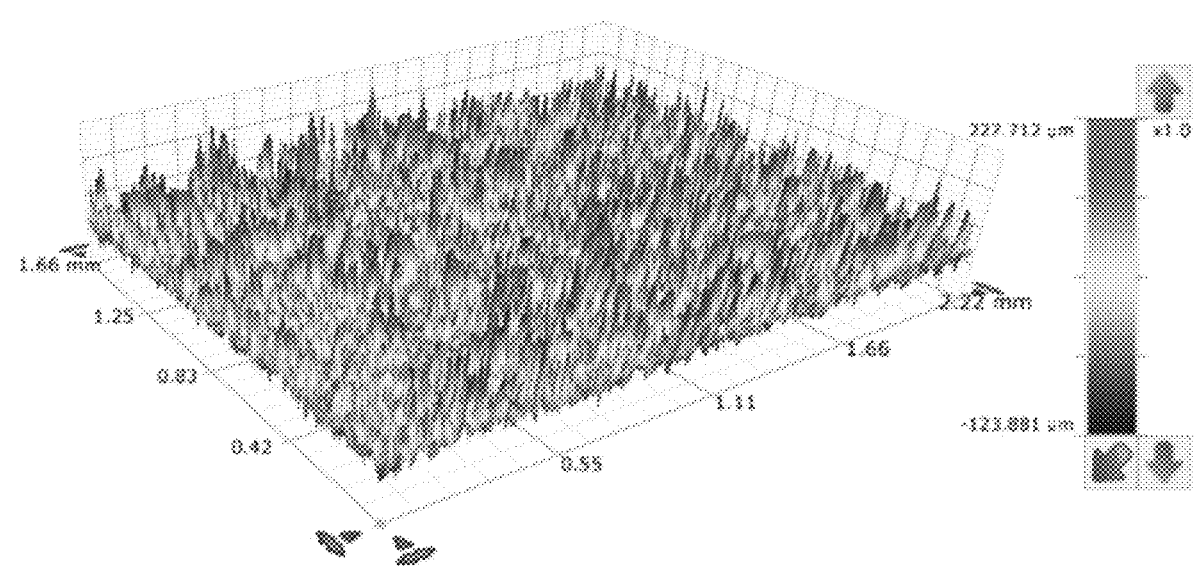
Figure 9:
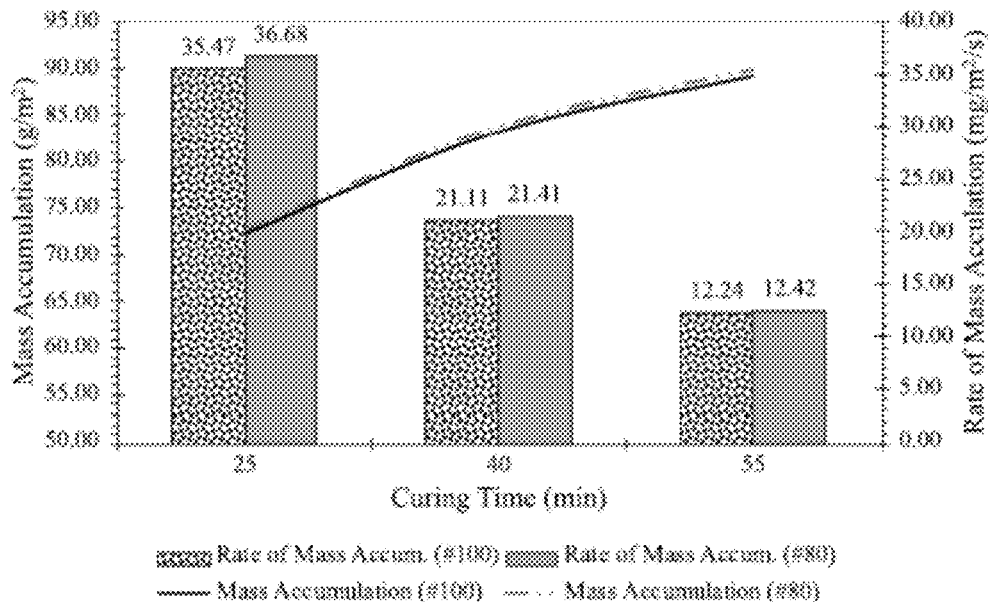
FIG. 9 is a plot of RPP mass accumulation curves vs. curing time.

Surface profile results of the RPP-treated asphalt substrates with respect to Ra and RMS roughness parameter are presented in FIG. 7. The Ra and RMS of the various RPP-treated asphalt surfaces increased up to 40 min of curing duration. But beyond 40 min up to 55 min, roughness of the various surfaces stopped increasing. Asphalt surface treated with mesh #80 micronized RPP showed higher roughness than those treated with mesh #100 RPP. This observation is true for both Ra and RMS values obtained at different curing durations. Higher roughness of the asphalt surfaces treated with mesh #80 RPP can be associated with the fact that mesh #80 RPP powders have a bigger grain size than the mesh #100 RPP. Sample 3D surface profiles of the various RPP-treated asphalt surfaces are presented in FIGS. 8A-8F. The increase in the surface roughness with increase in curing duration was due to micronized RPP adhering to the asphalt surface (see FIGS. 13A-13D). The amount of RPP adhering to the asphalt surface was observed to increase with increase in the curing duration, as shown in FIG. 9. No significant difference in mass accumulation was observed between the mesh #80 RPP-treated asphalt surfaces and those treated with mesh #100, indicating that the resulting difference in observed surface roughness to be associated with the difference in the sizes of the two micronized RPP powders. Continuous increase in mass accumulation and non-increase in surface roughness from 40 min to 55 min (see FIGS. 7 and 9) indicates that, some already attached RPP sank deeper in to the asphalt substrate allowing other additional RPP particles to adhere to the asphalt substrate.

Figure 10:
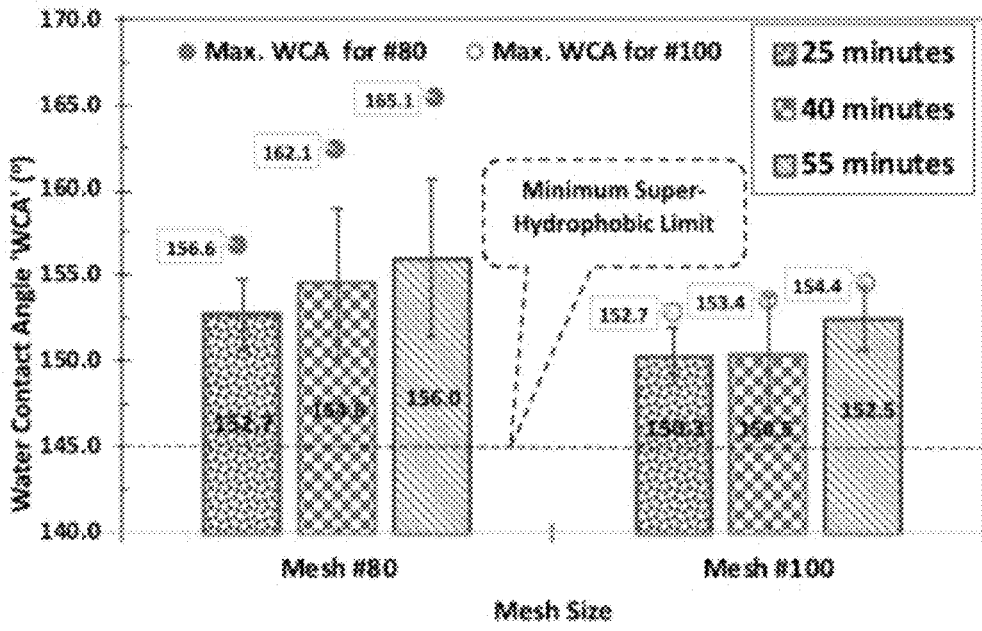
FIG. 10 is a plot of water contact angle measurement results of the RPP-treated asphalt surfaces.
Figures 11A, 11B, 11C, 11D:
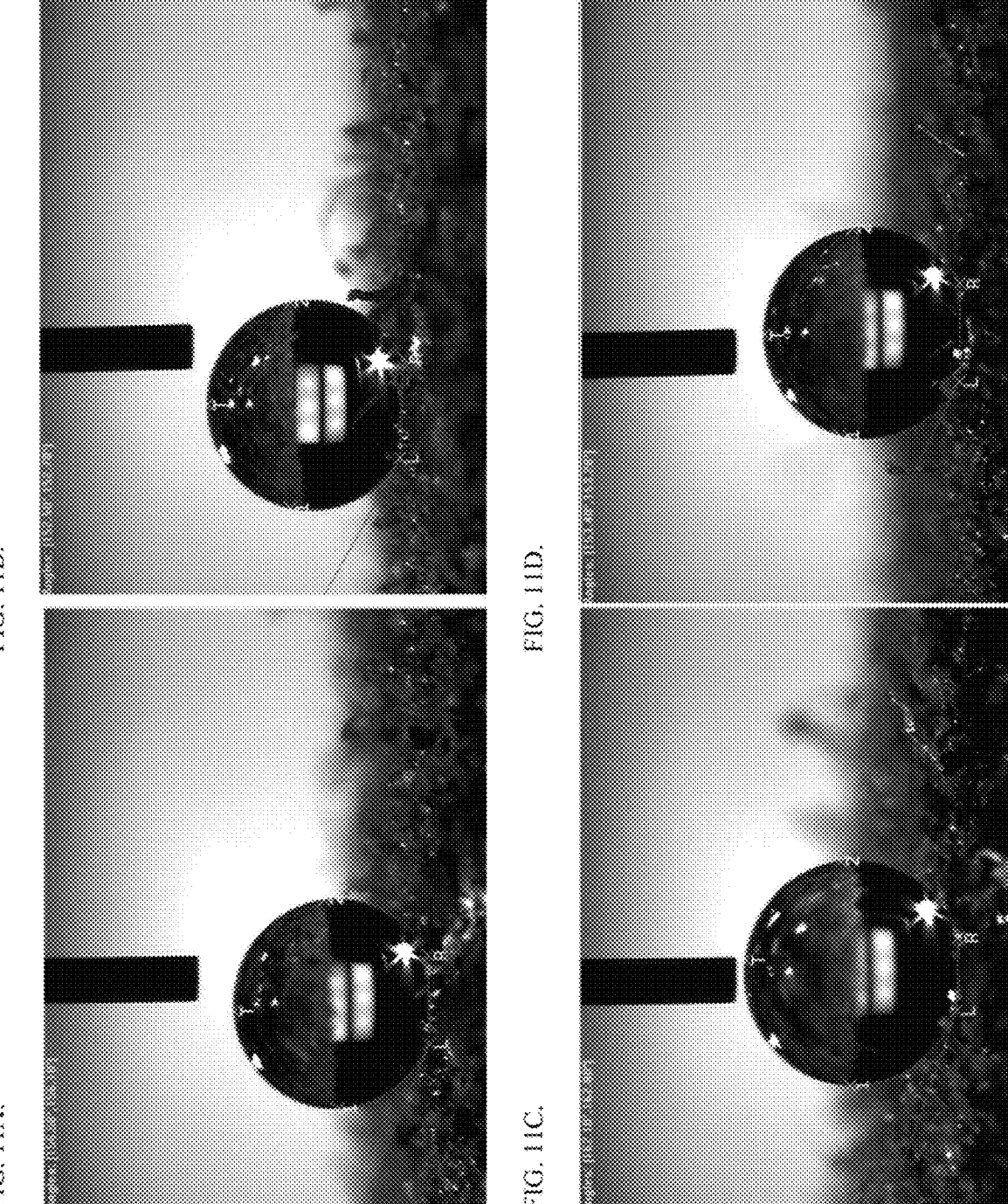
FIGS. 11A-11F are images of the water contact angle measurements of asphalt substrate treated with RPP-mesh #80 cured for 25 min (FIG. 11A), 40 min (FIG. 11B), 55 min (FIG. 11C), and RPP-mesh #100 cured for 25 min (FIG. 11D), 40 min (FIG. 11E), and 55 min (FIG. 11F)
Figures 11E, 11F:
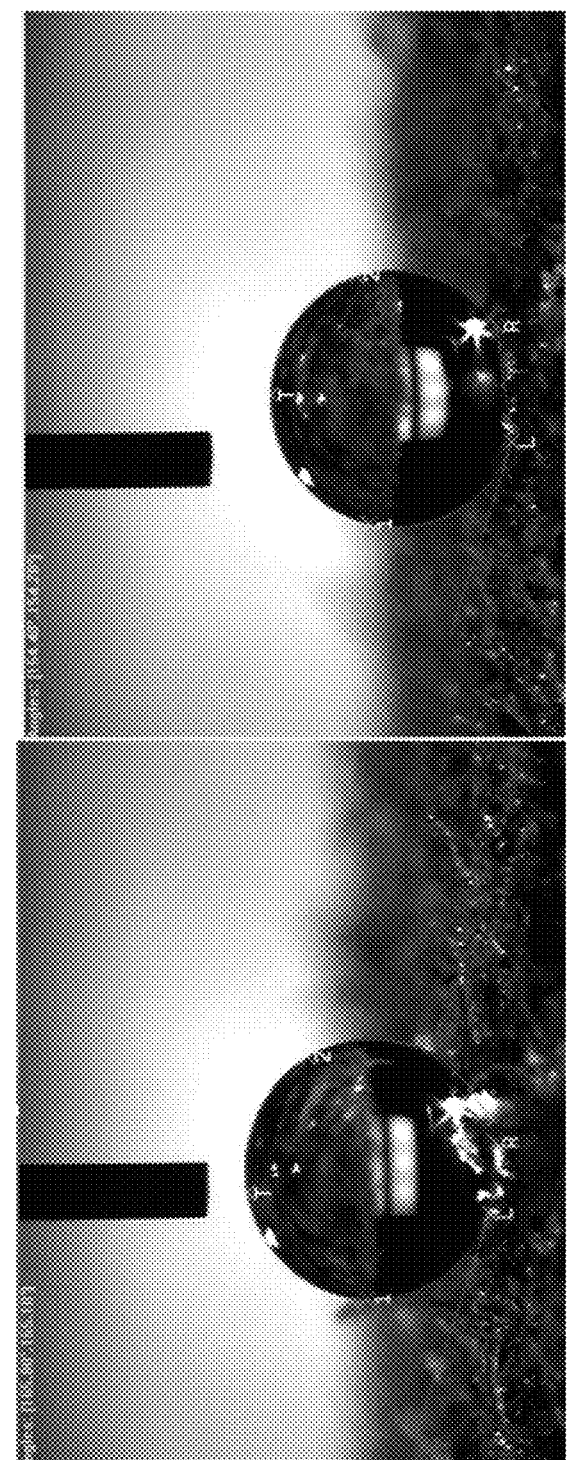

The average and maximum observed WCAs of the various asphalt surfaces treated with the micronized RPP are shown in FIG. 10. In comparison to the WCA of the asphalt substrate (110°) and the RPP sheet (59°) (see FIGS. 5A-5B), the micronized RPP-treated asphalt surfaces showed significant increase in WCA. All the treated asphalt surfaces showed WCA significantly higher than the lower superhydrophobic limit of 145°, making the various surfaces to exhibit superhydrophobic properties. Sample images of the maximum observed WCA of the various treated asphalt substrates are presented in FIGS. 11A-11F. In general, the average and maximum WCA increases with increase in curing duration. This trend is more obvious with respect to asphalt substrates that were treated with mesh #80 RPP. The asphalt surfaces treated with mesh #80 RPP showed higher WCA than those treated with mesh #100 RPP powder. This could be because the asphalts treated with mesh #80 RPP showed higher surface roughness (see FIG. 7) and slightly higher mass-accumulation (see FIG. 9) than the asphalt surfaces treated with mesh #100 RPP.

Figure 12:
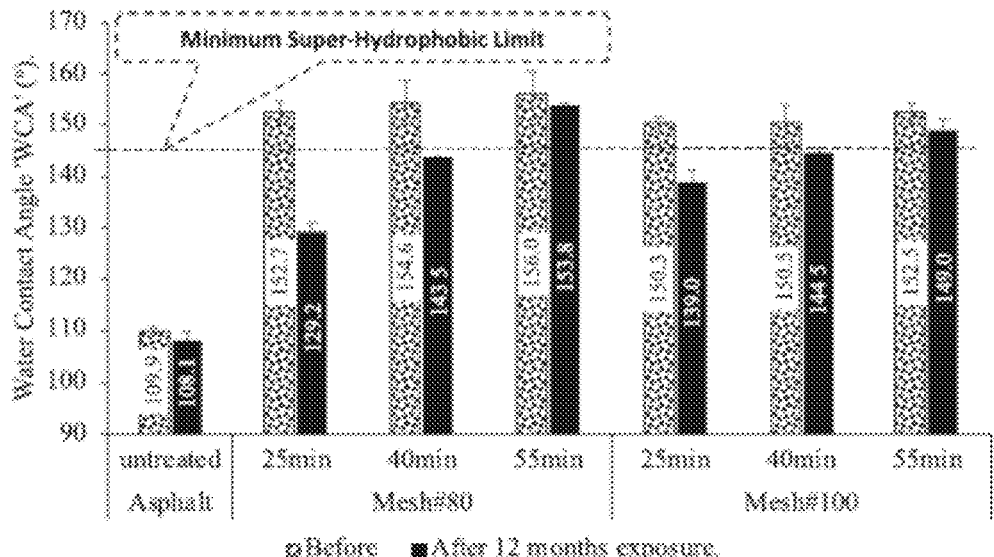
FIG. 12 is a plot of water contact angle of various RPP-treated surfaces before and after 12 month exposure.

Results of the WCA before and after exposure are presented in FIG. 12. Even the untreated asphalt substrate showed a slight loss of WCA after the 12-months exposure. This could be associated with loss of some volatile/oily organic component in the asphalt that usually accompanied short-term aging [X. Lu, and U. Isacsson, Constr. Build. Mater. 16 (1) (2002) 15-22]. The micronized RPP-treated asphalt surfaces also showed lower WCA after exposure, but asphalt substrates cured for longer duration showed lesser loss in WCA than those cured for shorter duration. The asphalt substrates cured for longer duration happened to have higher accumulated mass of the micronized RPP than those cured for shorter duration (see FIG. 9). In addition, the micronized RPP on the asphalt substrates that were cured for longer duration are more likely to be deeply rooted and adhere more effectively. Even after the 12 months exposure, the 55 min cured asphalt substrates showed appreciable WCA margin above the lower superhydrophobic limit of 145°. A similar trend of before and after exposure was observed in similar previous study involving asphalt surfaces treated with micronized recycled polyethylene [M. A. Dalhat, and A. Y. Adesina, Constr. Build. Mater. 240 (2020)].

Work of adhesion is defined as the energy per unit area required to separate un-absorbed liquid from a solid surface [N. K. Adam, and H. K. Livingston, Nature 182 (1958) 128]. It is an energy parameter that gives a measure of anti-icing and water resistance of a given surface [T. Bharathidasan, et. al., Appl. Surf. Sci. 314 (2014) 241-250]. Results of the WA for the RPP-treated asphalt surfaces before and after exposure are summarized in Table 2. It can be observed that the RPP-treated asphalt surfaces showed significantly lower WA values, relative to the untreated asphalt surface. This signifies an improvement in water resistance and higher anti-icing potential of the RPP-treated asphalt surfaces. The WA decreases with increase in treatment duration, which corresponds to the increase in WCA previously observed (see FIG. 10). Approximately 86% and 83% estimated drop in WA were observed after 55 min curing for mesh #80 and mesh #100 RPP surfaces respectively, before exposure. After exposure, the drop in WA for these surfaces are around 71% and 73% respectively.

TABLE 2

Work of Adhesion on the various RPP-treated asphalt surfaces.
All values have units of mNm$^{-1}$.

| Curing Time | Mesh #80 | | Mesh #100 | |
| | Before exposure | After exposure | Before exposure | After exposure |
| --- | --- | --- | --- | --- |
| Untreated | 47.71 ± 0.35 | 49.87 ± 0.37 | 47.71 ± 0.35 | 49.87 ± 0.37 |
| 25 min | 8.15 ± 1.22 | 26.76 ± 1.66 | 9.57 ± 1.03 | 17.87 ± 1.37 |
| 40 min | 7.27 ± 2.18 | 14.37 ± 0.26 | 9.55 ± 1.93 | 13.60 ± 0.80 |
| 55 min | 6.50 ± 2.15 | 7.45 ± 0.29 | 8.28 ± 1.14 | 10.47 ± 1.53 |

Figure 13A:
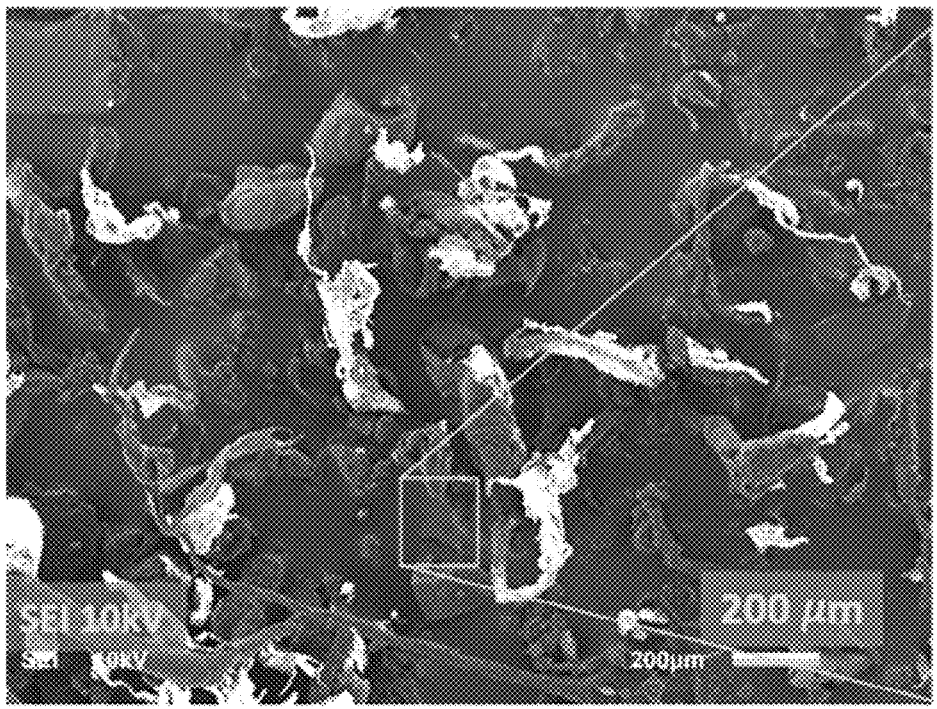
FIGS. 13A-13D are SEM images of RPP-treated asphalt surfaces where
Figure 13B:
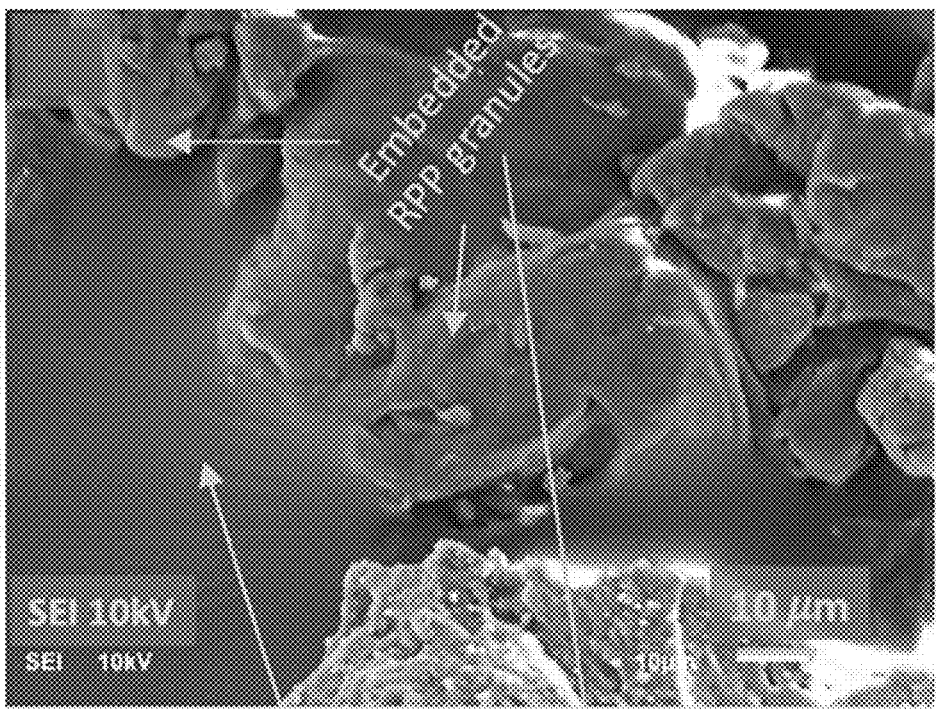
Figure 13C:
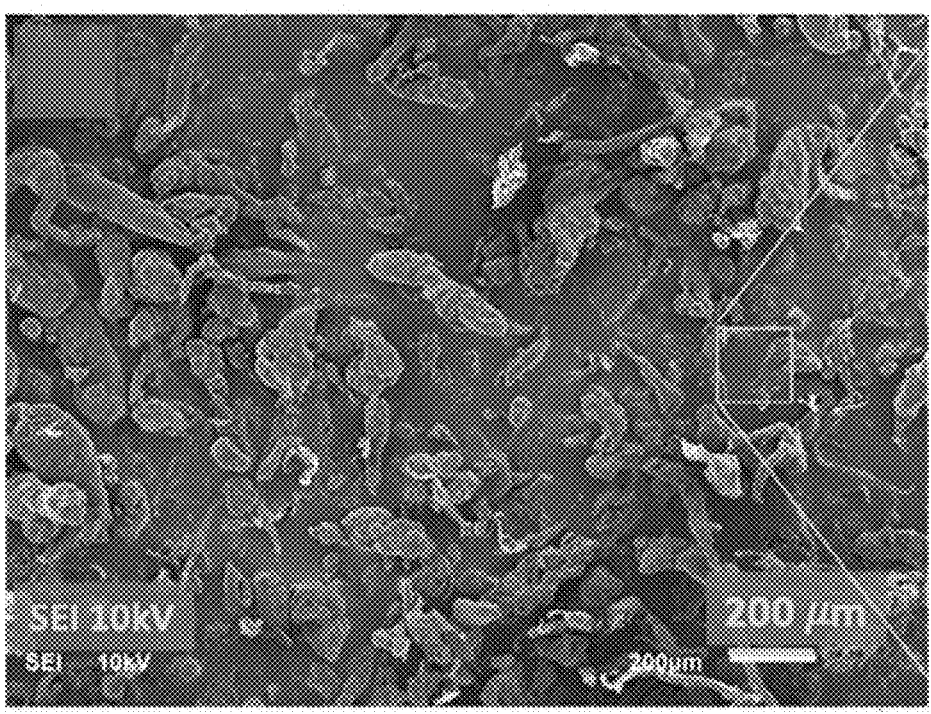
Figure 13D:
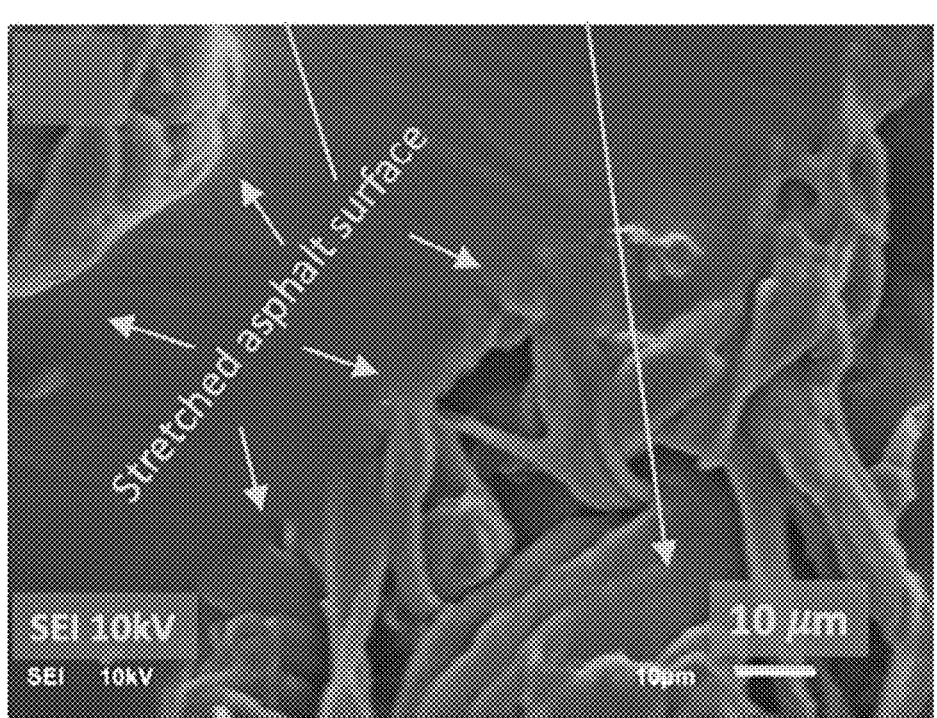

The surface morphology and asphalt-RPP interface of the RPP-treated asphalt substrates cured at 55 min are shown in FIGS. 13A-13D. One major difference between the mesh #80 treated asphalt surface in FIGS. 13A-13B and that of mesh #100 shown in FIGS. 13C-13D is the height of attached RPP particles. The mesh #80 RPP particles being bigger and more elongated were mostly attached to the asphalt surface perpendicularly as opposed to the mesh #100 RPP particles that mostly got attached side-ways. This made the #80 micronized RPP asphalt surface to have a better droplet suspension system. As a result, the asphalt substrates treated with mesh #80 RPP exhibited higher WCA than those treated with mesh #100 RPP. Observing the asphalt-RPP interface from FIGS. 13B & 13D revealed that the RPP particulates (both mesh #80 and #100) were fully embedded on to the asphalt substrate. The adhered micronized RPP resulted in micro-mountains on the asphalt surface at closer inspection (see FIGS. 13B & 13D). It also led to the increase in surface roughness of the asphalt substrate previously observed in FIG. 7. Embedment of the micronized RPP particulates resulted in stretching of asphalt substrate as well. This is obvious if the un-treated asphalt substrate shown in FIG. 3 is compared to that seen in FIGS. 13B and 13D. The zigzag oriented micro-ridge and valley texture previously observed on the asphalt substrate is now transformed in to smoother thin stretched marks that are linearly oriented towards the RPP particles. This transformation has a lot to do with the higher WCA observed for the RPP-treated asphalt surfaces, as compared to the untreated substrate.

The obtained results of WCA and surface profile were statistically analyzed using analysis of variance. This was done to assess the extent to which the experimental variables influenced the studied parameters. MiniTab18™ was employed for statistical analysis at 5% level of significance. Table 3 presents the statistical analysis of the surface profile variables (Ra & RMS) vs. curing time and RPP size as factors. Abbreviations in the table include degree of freedom (DF), adjusted sum of square (Adj. SS), adjusted mean square (Adj. MS), Fisher's statistic value (F-value), and P-value statistics. The curing duration and micronized RPP size were found to have significant influence on the surface roughness of the various treated asphalt substrates (P-value<0.05). This implies that the observed difference in surface roughness between the mesh #80 and mesh #100 RPP-treated asphalt surfaces was statistically significant. However, there is insufficient statistical evidence to conclude that the curing duration and the RPP size had an interactive effect on the surface roughness parameters of the RPP-treated asphalts (P-value>0.05).

TABLE 3

Analysis of variance results for surface
roughness of RPP treated asphalt.

| Response | Factors | DF | Adj. SS | Adj. MS | F-value | P-value |
| --- | --- | --- | --- | --- | --- | --- |
| Ra | Curing time | 2 | 287.21 | 143.606 | 14.64 | 0.001* |
| Roughness | Mesh Size | 1 | 67.62 | 67.625 | 6.89 | 0.022* |
| | Interaction | 2 | 36.06 | 18.028 | 1.84 | 0.201 |
| | Error | 12 | 117.71 | 9.809 | — | — |
| | | | | | | |
| | Total | 17 | 508.60 | — | — | — |
| RMS | Curing Time | 2 | 614.39 | 307.200 | 13.91 | 0.001* |
| Roughness | Mesh Size | 1 | 143.20 | 143.200 | 6.48 | 0.026* |
| | Interaction | 2 | 57.46 | 28.730 | 1.30 | 0.308 |
| | Error | 12 | 265.02 | 22.090 | — | — |
| | | | | | | |
| | Total | 17 | 1080.07 | — | — | — |

*indicates statistically significant factor (P-value < 0.05).

Table 4 presents the statistical analysis of the WCA before and after exposure as response, vs. curing duration and RPP size as factors. Before exposure, the curing duration did not show significant influence on the WCA of RPP-treated asphalt substrates (P-value=0.07>0.05). However, the curing time significantly affects the WCA of the various treated asphalt surfaces after the exposure (P-value<0.05). It was previously observed that substrates cured for longer duration exhibited lower loss of WCA after exposure, see FIG. 12. Since the accumulated mass of the RPP was found to be proportional to the curing duration, it implies that treatments which will results in higher RPP mass concentration on the asphalt surface are more likely to yield durable RPP-asphalt surfaces. On the other hand, size of the RPP significantly influences the WCA before and after the exposure (P-value<0.05). Additionally, interactive effect of the curing duration and RPP size on the WCA after exposure is found to be statically significant (P-value<0.001). This means that both parameters (size of the RPP and curing duration) are vital for establishing a good SH RPP-treated asphalt membrane.

TABLE 4

Analysis of variance results for WCA of RPP treated asphalt surfaces.

| Response | Factors | DF | Adj. SS | Adj. MS | F-value | P-value |
| --- | --- | --- | --- | --- | --- | --- |
| WCA | Curing time | 2 | 87.931 | 43.966 | 2.88 | 0.070 |
| before | Mesh Size | 1 | 84.623 | 84.623 | 5.55 | 0.024* |
| exposure | Interaction | 2 | 6.783 | 3.391 | 0.21 | 0.810 |
| | Error | 32 | 511.885 | 15.996 | — | — |
| | | | | | | |
| | Total | 37 | 688.24 | — | — | — |
| WCA after | Curing Time | 2 | 992.61 | 496.307 | 63.03 | <0.001* |
| exposure | Mesh Size | 1 | 41.22 | 41.22 | 5.23 | 0.032* |
| | Interaction | 2 | 227.53 | 113.766 | 14.45 | <0.001* |
| | Error | 22 | 173.24 | 7.875 | — | — |
| | | | | | | |
| | Total | 27 | 1495.28 | — | — | — |

*indicates statistically significant factor (P-value < 0.05).

Statistical analysis of WA on the RPP-treated asphalt surfaces is presented in Table 5. Both the RPP size and curing duration showed significant effect on the WA for the various RPP-treated asphalt surfaces. This is found to be the case both before and after exposure. As previously observed in the case of WCA, there is also a significant interactive effect between the RPP mesh size and the curing duration on the WA. It can be seen that the significant increase in WCA is equally translated in to noticeable decline in WA.

TABLE 5

Analysis of variance results for WA of RPP treated asphalt surfaces.

| Response | Factors | DF | Adj. SS | Adj. MS | F-value | P-value |
|---|---|---|---|---|---|---|
| WA before exposure | Curing time | 2 | 21.374 | 10.6869 | 3.39 | 0.042* |
| | Mesh Size | 1 | 44.272 | 44.2716 | 14.06 | <0.001* |
| | Interaction | 2 | 1.677 | 0.8386 | 0.27 | 0.767 |
| | Error | 48 | 151.187 | 3.1497 | — | — |
| | Total | 53 | 221.577 | — | — | — |
| WA after exposure | Curing Time | 2 | 623.63 | 311.815 | 72.69 | <0.001* |
| | Mesh Size | 1 | 39.9 | 39.896 | 9.3 | 0.006* |
| | Interaction | 2 | 142.63 | 71.314 | 16.63 | <0.001* |
| | Error | 22 | 94.37 | 4.29 | — | — |
| | Total | 27 | 957.73 | — | — | — |

*indicates statistically significant factor (P-value < 0.05).

The invention claimed is:

1. A method of modifying asphalt to form a superhydrophobic asphalt, comprising:

blending styrene-butadiene-styrene with a non-modified asphalt to form a polymer modified asphalt, applying a layer of polypropylene granules to a surface of the polymer modified asphalt, wherein the polymer modified asphalt has a softening point of 80 to 95° C., a viscosity at 135° C. of 1575 to 1650 cP, a ductility at 25° C. of 11.5 to 17.5 cm, a flash point of 300 to 360° C., and a performance grade of 76-10, wherein the polypropylene granules are substantially free of fluoropolymers, have a maximum particle size of 250 μm, a minimum particle size of 100 μm, and are present on the uncured coated asphalt in an amount of 185 to 275 g polypropylene granules per m² of surface of the polymer modified asphalt, to form an uncured coated asphalt; and curing the uncured coated asphalt at 75 to 150° C. and at a temperature less than the melting point of said polypropylene granules, for 15 to 90 minutes, to form the superhydrophobic asphalt, wherein:

the superhydrophobic asphalt comprises a polypropylene layer disposed upon a polymer modified asphalt layer, has a water contact angle of 145 to 170°; and wherein the polypropylene layer is present in an amount of 50 to 125 g per m² of polymer modified asphalt layer, has a $R_a$ surface roughness of 10 to 50 μm, and the polypropylene particles are mostly attached to the asphalt surface perpendicularly, as opposed to sideways, and wherein the superhydrophobic asphalt has a work of adhesion of 1 to 15 mN/m.

2. The method of claim 1, wherein the styrene-butadiene-styrene is a radial styrene-butadiene-styrene and is present in an amount of 0.5 to 10 wt % based on a total weight of the polymer modified asphalt.

3. The method of claim 1, wherein the polymer modified asphalt has a softening point of 84 to 88° C., a viscosity at 135° C. of 1605 to 1620 cP, a ductility at 25° C. of 13.75 to 15.25 cm, a flash point of 320 to 340° C., and a performance grade of 76-10.

4. The method of claim 1, wherein the polypropylene granules are present on the uncured coated asphalt in an amount of 215 to 245 g polypropylene granules per m² of surface of the polymer modified asphalt.

5. The method of claim 1, wherein the polypropylene granules have a minimum particle size of 149 μm.

6. The method of claim 1, wherein the curing is performed for 40 to 55 minutes.

7. The method of claim 1, wherein the polypropylene layer is present in an amount of 80 to 90 g per m² of polymer modified asphalt layer.

8. The method of claim 1, wherein the superhydrophobic asphalt has a work of adhesion of 6.50-9.60 mN/m.

9. The method of claim 1, wherein the polypropylene layer has a $R_a$ surface roughness of 20 to 40 μm.

* * * * *